US011463270B2

(12) United States Patent
Swierk et al.

(10) Patent No.: US 11,463,270 B2
(45) Date of Patent: Oct. 4, 2022

(54) SYSTEM AND METHOD FOR OPERATING AN INTELLIGENT FACE FRAMING MANAGEMENT SYSTEM FOR VIDEOCONFERENCING APPLICATIONS

(71) Applicant: Dell Products, LP, Round Rock, TX (US)

(72) Inventors: Todd E. Swierk, Austin, TX (US); Vivek Viswanathan Iyer, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 0 days.

(21) Appl. No.: 17/161,582

(22) Filed: Jan. 28, 2021

(65) Prior Publication Data

US 2022/0239513 A1     Jul. 28, 2022

(51) Int. Cl.
*H04L 12/18*         (2006.01)
*H04N 5/232*         (2006.01)
*G06N 3/04*          (2006.01)
*G06V 40/16*         (2022.01)

(52) U.S. Cl.
CPC ........... *H04L 12/1822* (2013.01); *G06N 3/04* (2013.01); *G06V 40/166* (2022.01); *H04N 5/23296* (2013.01)

(58) Field of Classification Search
CPC .............. G06V 40/166; H04N 5/23296; H04L 12/1822
USPC ........................................................ 709/204
See application file for complete search history.

(56) References Cited

U.S. PATENT DOCUMENTS

| 5,867,654 | A  | * | 2/1999  | Ludwig ................... H04L 51/04 348/E7.083 |
| 7,227,573 | B2 |   | 6/2007  | Stavely |
| 7,682,026 | B2 | * | 3/2010  | Huffman ................ G06V 40/19 351/209 |
| 8,171,151 | B2 |   | 5/2012  | Dunbar |
| 8,587,696 | B2 |   | 11/2013 | Georgis |
| 8,780,166 | B2 |   | 7/2014  | Shanmukhadas |
| 8,947,493 | B2 | * | 2/2015  | Lian ........................ H04N 7/15 348/14.08 |
| 9,082,391 | B2 |   | 7/2015  | Yermeche |
| 9,584,758 | B1 | * | 2/2017  | Chen ....................... G10L 25/60 |
| 10,795,006 | B2 | * | 10/2020 | Garcia .................... G01S 17/08 |
| 10,904,485 | B1 | * | 1/2021  | Childress, Jr. ....... G06V 40/161 |
| 11,222,466 | B1 | * | 1/2022  | Naruniec ............. G06V 40/171 |
| 2004/0223631 | A1 | * | 11/2004 | Waupotitsch .......... G06V 40/16 382/118 |

(Continued)

*Primary Examiner* — Tauqir Hussain
(74) *Attorney, Agent, or Firm* — Prol Intellectual Property Law, PLLC; H. Kenneth Prol

(57) ABSTRACT

A system or method executing an intelligent face framing management system comprising a processor to execute code instructions of a multimedia multi-user collaboration application to join a videoconference session, a display screen, a speaker, a video camera, and a microphone where the video camera captures a videoframe of a user and the processor to input videoframe data, including the detected user's image, into a trained neural network to determine image features for the intelligent face framing management system to generate optimized face framing adjustments center or normalize the user's image in the captured videoframes or intelligently select an alternate camera and prepare those videoframes for transmission.

20 Claims, 8 Drawing Sheets

(56) References Cited

U.S. PATENT DOCUMENTS

| | | | |
|---|---|---|---|
| 2004/0267778 A1 | 12/2004 | Rudolph | |
| 2004/0268369 A1 | 12/2004 | Debique | |
| 2008/0122924 A1* | 5/2008 | Tashiro | G16H 40/20 348/51 |
| 2009/0323818 A1* | 12/2009 | Weiss | H04N 21/8173 375/240.18 |
| 2010/0079508 A1* | 4/2010 | Hodge | G06F 1/3206 345/697 |
| 2011/0074910 A1* | 3/2011 | King | H04N 7/152 348/E7.083 |
| 2011/0283203 A1* | 11/2011 | Periyannan | H04N 5/265 715/753 |
| 2012/0147129 A1* | 6/2012 | Tucker | H04M 3/567 348/E7.083 |
| 2014/0016837 A1 | 1/2014 | Nechyba | |
| 2014/0050408 A1* | 2/2014 | Balasubramanian | G06V 40/176 382/218 |
| 2015/0373303 A1* | 12/2015 | Visosky | G06V 40/171 348/14.05 |
| 2018/0098026 A1* | 4/2018 | Gadnir | H04N 7/152 |
| 2018/0167581 A1* | 6/2018 | Goesnar | H04M 3/56 |
| 2018/0352195 A1* | 12/2018 | Segal | H04N 21/4782 |
| 2020/0344278 A1* | 10/2020 | Mackell | H04N 7/147 |
| 2021/0176429 A1* | 6/2021 | Peters | G06V 20/41 |
| 2021/0185276 A1* | 6/2021 | Peters | G06V 20/41 |
| 2021/0218845 A1* | 7/2021 | Magi | G06V 40/18 |
| 2021/0235040 A1* | 7/2021 | Childress, Jr. | H04N 7/04 |

\* cited by examiner

SYSTEM AND METHOD FOR OPERATING AN INTELLIGENT FACE FRAMING MANAGEMENT SYSTEM FOR VIDEOCONFERENCING APPLICATIONS

FIELD OF THE DISCLOSURE

The present disclosure generally relates to multimedia, multi-user collaboration applications, such as videoconferencing applications. More specifically, the present disclosure relates to intelligently managing media processing pursuant to execution of such applications, based on performance metrics for an information handling system, and context factors for the appearance of a user within a videoframe related to a current user videoconference session.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
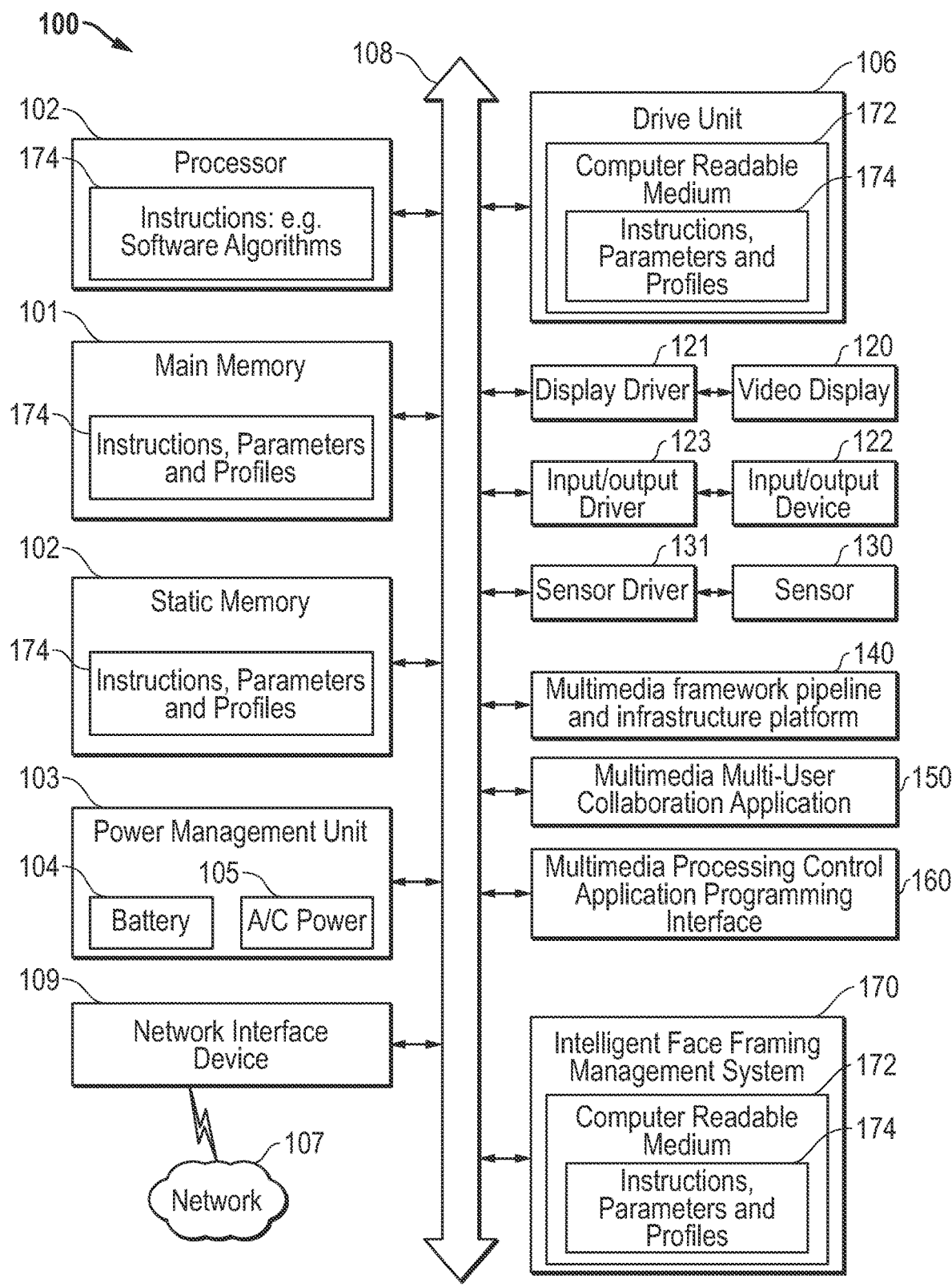
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

As working remotely has gained in popularity, so too has the prevalence of multi-employee or multi-business video conferences. Many of these video conferences (also referred to as web-conferences, online meetings, tele-video conferences, or remote conferences) may include any number of people, but sometimes exceeds 50 or 100 participants. In many cases, as workers increasingly work from home, tools such as multimedia multi-user collaboration applications (MMCAs) are used to conduct videoconference meetings and collaborations on documents or projects among workers, with customers or clients, or even in casual settings among friends and family.

With busy schedules that may include many online meetings or interspersed formal/business and casual or videoconference meetings while working from home, many users are multitasking by working in various applications running concurrently with the MMCA during a videoconference session. This may result in the user looking from one peripheral display to another, or shifting positions with respect to various peripheral displays. In many cases, employees or users working from home may have multiple cameras, often mounted to a plurality of peripheral displays recording videoframes of the users' images for display during the videoconference. Only one of these multiple displays may display the MMCA graphical user interface (GUI) during a videoconference. Most existing MMCAs employ a specifically identified default camera (e.g., the camera mounted to or incorporated within the display on which the MMCA GUI is displayed) for capturing videoframes of the user during videoconference sessions. If the user averts their gaze toward another display and away from the camera capturing videoframes including their image, the camera may only capture a portion or side-view of the user, rather than a portrait, front-facing view of the user which may be desirable for efficient communication among participants. For example, video of a user located at an angle with respect to the user, or a relatively close or far distance from the camera may fail to capture minor facial expressions or other social cues important to good communication. Similarly, if the user's position shifts to interface more easily with a peripheral device upon which the camera is not mounted, the user's position may move undesirable close to, farther away from, or off to the side of the camera capturing videoframes including the user's image. The position of the user within the resulting captured videoframe may be undesirable large and detailed, distant and lacking in detail, or distractingly off-center.

Existing multimedia multi-user collaboration applications hosting such video conferences perform the same video processing methods on videos of each participant without accounting for the appearance concerns that may be important to a user of an MMCA. Such processing of videoframes may occur both at each individual participant's computing device captured by a selected or default camera, and be transmitted to all other participant's computing devices of all other participants which may cause distraction or inhibit efficient communication.

The intelligent face framing management system in embodiments of the present disclosure addresses these framing issues by using a trained machine-learning neural network to identify a gaze-centered camera toward which the user is currently facing for capturing videoframes including images of the user during a videoconference session. In such embodiments, the intelligent face framing management system may gather measurements of the user's gaze and face orientation in multiple videoframes captured by each of a plurality of available cameras. The intelligent face framing management system may then identify a gaze-centered camera for capturing videoframes including images of the user by selecting the camera that captured videoframes in which the measured user's gaze and head orientation are closest to being centered on the camera. In such a way, the intelligent face framing management system may select a camera into which the user is most likely to be looking, and thus, most likely to capture videoframes including a front-facing image of the user.

Embodiments of the present disclosure may also address these framing issues by centering the user's face within a captured videoframe regardless of which camera is used. For example, the intelligent face framing management system in embodiments may use a trained image detection model to identify the user's face and nose within a captured videoframe. The intelligent monitoring management system in embodiments may then crop or resize, or digitally zoom if necessary, the captured videoframe in order to place the user's face and nose within the center of the captured videoframe. In such a way, the intelligent face framing management system may remedy distractions caused by the user appearing to other participants to be off-center in the captured videoframes including images of that user when the user moved within the camera's field of view. User movements may be monitored with a proximity sensor in embodiments, such as with a time of flight sensor, and upon movements of a sufficient amount the system may conduct readjustments of the centering via the, resizing, cropping, or digital zooming to maintain normalizing the user's image within videoframes.

These framing issues may also address in still further embodiments of the present disclosure by zooming in or out on the user's face within a captured videoframe in order to normalize the perceived distance between the camera and the user within the captured videoframes (e.g., sizing the user's face within the videoframe). For example, the intelligent face framing management system in embodiments may determine a percentage range of the captured videoframe in which the user's face, as identified by the trained image detection model appears. The intelligent face framing management system in embodiments may then digitally zoom, resize or crop the captured videoframe such that the user's face appears in a preset threshold percentage range of the field of view of the camera, as captured within the videoframe of the user. In such a way, the intelligent face framing management system may remedy distractions caused by the user appearing to other participants to be too small or too large within the captured videoframes including images of that user, and may preserve other participants' visibility of the user's facial expressions required for comprehension of social cues. User movements may be monitored with a proximity sensor in embodiments, such as with a time of flight sensor, and upon movements of a sufficient amount the system may conduct readjustments of the size via the digital zoom, resizing, or cropping to maintain normalizing the user's image within videoframes.

The intelligent face framing management system in embodiments may thus determine one or more optimized face framing adjustments to center and appropriately size the user's face within the captured video sample for a variety of performance environments encountered by a single information handling system participating in multimedia multi-user collaboration application user sessions over time. In embodiments described herein, the term "media" may refer to images, videoframes, or video samples (e.g., compilation of several images over time) captured by a camera, audio samples captured by a microphone, or a combination of audio and video samples to form a media sample providing both audio and video as audio-visual (AV) data.

The intelligent face framing management system, or portions thereof, may operate remotely from the information handling system at which the videoframes including images of the user are captured in some embodiments. For example, the intelligent face framing management system may operate as part of an information handling system performance optimizer application as a service to users hosted, for example, by the manufacturer of the information handling system, or managed by the information handling system user's employer or Information Technology (IT) manager. Such an information handling system performance optimizer application may also operate in example embodiments in various contexts to monitor certain performance metrics at the information handling system, perform firmware and software updates, confirm security credentials and compliance, and manage user access across a plurality of information handling systems (e.g., as owned by an employer or enterprise corporation). In such embodiments, the intelligent face framing management system may receive videoframes including images of the user captured at the user's information handling system, or measurements of the user's gaze and head orientation determined at one or more cameras of the information handling system via any type of network, including out-of-band communications, and communications with one or more software applications, application programming interfaces (APIs), or directly with one or more controllers or firmware in kernel mode.

The intelligent face framing management system in embodiments may determine optimized face framing adjustments to be made to code instructions of various audio/visual (AV) processing instruction modules (e.g., video processing methods such as super resolution, user framing, zoom/normalization, background application, and audio processing modules such as background noise reduction, etc.) to apply to a captured video or audio sample of the user. Such AV processing instruction modules may comprise code instructions or algorithms executed by a processor of the information handling system to transform a media sample data such as a video sample or audio sample through some form of AV data processing technique.

The multimedia framework pipeline and infrastructure platform of the transmitting information handling system in embodiments may execute each of the AV processing instruction modules set or requested by the multimedia multi-user collaboration application on the audio samples or video samples captured by a default or optimized camera at the transmitting information handling system using the optimized face framing adjustments in order to create processed, encoded media samples that combine both video and audio samples into a single file. Media samples may be referred to herein as "processed" when the video sample or audio sample upon which the media sample is created has undergone at least one AV processing instruction, which may include an encoding process, or other audio/video processing methods (e.g., zooming, virtual background application, blurring, image appearance filter alterations, cropping, user framing, resolution adjustment, normalization, eye contact correction, background noise reduction, etc.).

Upon processing of media samples, the multimedia framework pipeline and infrastructure platform may transmit the processed, encoded media sample that includes re-framed video of the transmitting information handling system user to the multimedia multi-user collaboration application for the transmitting information handling system. The processed, encoded media sample may then be transmitted to other information handling systems (e.g., receiving information handling systems) in use by other participants within the current user session for the multimedia multi-user collaboration application. These receiving information handling systems may then reprocess and decode the received media sample, for playback at the displays for these receiving information handling systems. In such a way, the intelligent face framing management system may crop or resize videoframes including images of a user, as captured by a selected gaze-centered camera or default camera, to center the user and normalize the size of the user's face so as to most effectively communicate the user's facial expressions within the videoconference user session.

Turning now to the figures, FIG. 1 illustrates an information handling system 100 similar to information handling systems according to several aspects of the present disclosure. As described herein, the intelligent face framing management system 170 in an embodiment may operate to identify user features such as a user's nose or face and to generate optimized face framing adjustments that may adjust the user's image during the capture, processing, encoding, and transmission of a media sample (e.g., including audio or video) from a transmitting information handling system to a receiving information handling system. The information handling system 100 described with reference to FIG. 1 may represent a transmitting information handling system or a receiving information handling system in various embodiments. In other embodiments, information handling system 100 may operate as both a transmitting and a receiving information handling system, as may be the case for an information handling system transmitting video of one participant user while simultaneously executing code instructions for the multimedia multi-user collaboration application (MMCA) 150 to display videos of other participants within a shared user session.

In yet another embodiment, the information handling system 100 may operate remotely from all transmitting or receiving information handling systems executing code instructions of the MICA 150 to participate within a user session. For example, the intelligent face framing management system 170 may operate on a server, blade, rack, or cloud-based network maintained and controlled by the manufacturer of several information handling systems, or managed by an employer or enterprise owner of several information handling systems. In such an embodiment, the information handling system 100 may operate within one of these servers, blades, racks, or across various nodes of a cloud-based network to monitor certain performance metrics at each of the plurality of such information handling systems, perform firmware and software updates, confirm security credentials and compliance, and manage user access across the plurality of information handling systems (e.g., as owned by an employer or enterprise corporation). In such an embodiment, each of the plurality of transmitting and receiving information handling systems participating within a user session of the MMCA 150 may incorporate an agent or API for the intelligent face framing management system 170.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP), a base station transceiver, a wireless telephone, a control system, a camera, a scanner, a printer, a pager, a personal trusted device, a web appliance, or any other suitable machine capable of executing a set of instructions (sequential or otherwise) that specify actions to be taken by that machine, and may vary in size, shape, performance, price, and functionality.

The information handling system may include memory (volatile (e.g., random-access memory, etc.), nonvolatile (read-only memory, flash memory etc.) or any combination thereof), one or more processing resources, such as a central processing unit (CPU), a graphics processing unit (GPU), a vision processing unit (VPU), a Gaussian neural accelerator (GNA), hardware or software control logic, or any combination thereof. Additional components of the information handling system 100 may include one or more storage devices, one or more communications ports for communicating with external devices, as well as various input and output (I/O) devices 122, such as a keyboard, a mouse, a headset device, one or more microphones, one or more speakers, a touchpad, or any combination thereof. The information handling system 100 may also include various sensors 130 (e.g., Hall effect positional sensors, hinge rotation sensors, geographic locations sensors such as GPS systems, light sensors, time of flight sensors, infrared sensors, etc.). A power management unit 103 supplying power to the information handling system 100, via a battery 104 or an alternating current (A/C) power adapter 105 may also be included within information handling system 100, as well as one or more buses operable to transmit communications between the various hardware components. The information handling system 100 may further include a video display 120. The video display 120 in an embodiment may function as a liquid crystal display (LCD), an organic light emitting diode (OLED), a flat panel display, or a solid-state display. Portions of an information handling system 100 may themselves be considered information handling systems 100.

In an example embodiment, the information handling system 100 may include a laptop or desktop system that executes the MMCA 150 that may operate as a videoconferencing application. The MMCA 150 may include any computer code that is executed by a processor 102, or other processors of the information handling system 100 in order to decrease the processing load generated during capture, processing, and encoding of media samples for transmission, or during reprocessing, decoding, or display of received media samples, pursuant to execution of the MMCA 150. The multimedia framework pipeline and infrastructure platform 140 in an embodiment may execute code instructions to direct execution of specific processing and encoding of media samples for transmission, or direct execution of reprocessing, and decoding of received media samples.

The MMCA 150 in an embodiment may transmit to the multimedia framework pipeline and infrastructure platform 140 default settings for such processing, reprocessing, encoding, decoding, capture, and display (e.g., via bus 108). Such default settings may not be optimized, and may result in captured videoframes that include images of the user looking away from the camera, off-center of the videoframe, or located too far away or too close to the camera. The intelligent face framing management system 170 in an embodiment may be executable code that may operate to determine optimized settings (e.g., optimized face framing adjustments) at a transmitting information handling system (e.g., 100) for video capture, or optimized settings for execution of various AV processing instruction modules for processing and adjusting video samples captured using those optimized settings, for example.

The intelligent face framing management system 170 in an embodiment may include code instructions 174 for executing a neural network. The intelligent face framing management system 170 in an embodiment may gather various input values to input into a trained neural network, such as test videoframes with images of the user, hardware and software settings, sensor information, and other inputs as described herein from one or more information handling systems executing the MMCA (e.g., 150) in order to determine optimized face framing adjustments for each of the users of the one or more information handling systems where intelligent face framing features are selected by that user to intelligently monitor and adjust a user's appearance in the user's image within videoframes captured at each information handling system.

The multimedia processing control API 160 in an embodiment may operate to facilitate communication between various applications, controllers, and drivers of the information handling system 100 in an embodiment. For example, in an embodiment in which the neural network operates remotely from the information handling system 100 (e.g., the information handling system represents a receiving information handling system or transmitting information handling system), the multimedia processing control API 160 may operate to gather input values for the neural network from the input/output driver 123, sensor driver 131, multimedia framework pipeline and infrastructure platform 140, processor 110, main memory 101, power management unit 103, network interface device 109, or MICA 150 (e.g., via bus 108). The multimedia processing control API 160 in such an embodiment may transmit such gathered inputs to the remotely located neural network via network interface device 109 and network 107 in embodiments in which the neural network operates remotely from the information handling system 100 of a user. The trained neural network in another embodiment may be stored in main memory 101, static memory 102, or drive unit 106 (e.g., as instructions 174). In an embodiment in which the neural network is stored at the information handling system 100, the multimedia processing control API 160 may transmit the gathered inputs to the intelligent face framing management system 170 operating at the information handling system 100 (e.g., as instructions 174).

The trained neural network may then output optimized face framing adjustments to various drivers or applications via the multimedia processing control API 160 in response to detected user appearance anomalies. The optimized face framing adjustments in an embodiment may operate to adjust the size of the face image relative to the field of view in the captured videoframe to a size percentage range threshold of the face image in the captured videoframe, in an example. In another example, the optimized face framing adjustments in an embodiment may operate to center the face image location in the captured videoframe. In yet another example embodiment, the optimized face framing adjustments may operate to select a gaze-centered video camera from the plural video cameras having the minimum deviation from a central gaze of the user in the user's image in the captured videoframe. An optimized face framing adjustments to select a gaze-centered video camera may be transmitted (e.g., via bus 108) to the input/output driver 123 in an embodiment in which the input/output device 122 is a camera or microphone, for example. In such an example embodiment, the input/output driver 123 may be a streaming media driver, a camera driver, one of a plurality of camera drivers, or an audio driver for a microphone. As another example, in response to a user move toward or away from the camera or to one side or another in the camera's field of view, optimized face framing adjustments to center or resize the face image location in the captured videoframe may be transmitted (e.g., via bus 108) to the input/output driver 123 or to the multimedia framework pipeline and infrastructure platform 140. The trained neural network may perform such operations in an embodiment in which information handling system 100 is a transmitting information handling system, or in which information handling system 100 is a receiving information handling system.

In an embodiment in which the information handling system 100 represents a media capturing and transmitting information handling system, a camera operating as the input/output device 122 may capture videoframes including images of the user pursuant to the optimized face framing adjustments to select a gaze-centered video camera received at the streaming media driver or video driver operating as input/output driver 123. In another example of such an embodiment, a microphone operating as the input/output device 122 may capture audio. The video samples or audio samples so captured in an embodiment may be transmitted to the multimedia framework pipeline and infrastructure platform 140, which may apply one or more AV processing instruction modules defined by the received optimized face framing adjustments to the captured videoframes. The multimedia framework pipeline and infrastructure platform 140 in such an embodiment may engage the processor 110 (e.g., CPU, GPU, VPU, GNA) to execute such AV processing instruction modules on the captured video or audio samples to generate a processed, encoded media sample combining the video and audio samples. By capturing and processing the audio and video samples using these optimized instructions, the intelligent face framing management system 170 may direct various components of the transmitting information handling system (e.g., 100) to generate a videoframe captured by a gaze-centered camera, in which the image of the user is centered and sized within a preset percentage range of the size of the videoframe. The MMCA 150 may then direct transmission of the processed, encoded media sample to other information handling systems operated by other participants of the user session for the MMCA 150, via network interface device 109 and network 107.

In a networked deployment, the information handling system 100 may operate in the capacity of a server or as a client computer in a server-client network environment, or as a peer computer system in a peer-to-peer (or distributed) network environment. In a particular embodiment, the information handling system 100 may be implemented using electronic devices that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

Information handling system 100 may include devices or modules that embody one or more of the devices or execute instructions for the one or more systems and modules described herein, and operates to perform one or more of the methods described herein. The information handling system 100 may execute code instructions 174 that may operate on servers or systems, remote data centers, or on-box in individual client information handling systems according to various embodiments herein. In some embodiments, it is understood any or all portions of code instructions 174 may operate on a plurality of information handling systems 100.

The information handling system 100 may include a processor 110 such as a CPU, GPU, VPU, GNA, control logic or some combination of the same. Any of the processing resources may operate to execute code that is either firmware or software code. Specifically, the processor 110 may operate to execute code instructions of firmware for the input/output driver 123, such as part of a streaming media driver, in an embodiment. Moreover, the information handling system 100 may include memory such as main memory 101, static memory 102, or other memory of computer readable medium 172 storing instructions 174 of the intelligent face framing management system 170, and drive unit 106 (volatile (e.g., random-access memory, etc.), nonvolatile memory (read-only memory, flash memory etc.) or any combination thereof. A processor 110 may further provide the information handling system with a system clock for which a time of day clock may be tracked along with any location detector such as global positioning system or in coordination with a network interface device 109 connecting to one or more networks 107. The information handling system 100 may also include one or more buses 108 operable to transmit communications between the various hardware components such as any combination of various input and output (I/O) devices 122, sensors 130, video display 120.

The network interface device 109 may provide wired or wireless connectivity to a network 107, e.g., a wide area network (WAN), a local area network (LAN), wireless local area network (WLAN), a wireless personal area network (WPAN), a wireless wide area network (WWAN), or other network. Connectivity may be via wired or wireless connection. The network interface device 109 may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used. In some aspects of the present disclosure, one network interface device 109 may operate two or more wireless links. Network interface device 109 may also connect to any combination of macro-cellular wireless connections including 2G, 2.5G, 3G, 4G, 5G or the like. Utilization of radiofrequency communication bands according to several example embodiments of the present disclosure may include bands used with the WLAN standards and WWAN carriers, which may operate in both licensed and unlicensed spectrums.

The network interface device or NID 109 may operate to establish communication links under wired or wireless protocols enabling MMCA 150 communications for purposes of conducting a videoconference according to embodiments herein. Further, the NID may utilize other communication links under wired or wireless protocols to enable data communications for other operating applications of the information handling system 100. Additionally, the NID may utilize other communication links under wired or wireless protocols to enable data communications out of band and separate from the communication links for the videoconferencing session by the MMCA 150, such as communications to support the MMCA 150 or enable some or all parts of remote operation of the MMCA 150 or the intelligent face framing management system 170.

In some embodiments, software, firmware, dedicated hardware implementations such as application specific integrated circuits, programmable logic arrays and other hardware devices may be constructed to implement one or more of some systems and methods described herein. For example, some embodiments may include operation of embedded controllers for various applications or input/output devices 122.

Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations may include distributed processing, component/object distributed processing, and parallel processing. Alternatively, virtual computer system processing may be constructed to implement one or more of the methods or functionalities as described herein.

The present disclosure contemplates a computer-readable medium that includes instructions, parameters, and profiles 174 or receives and executes instructions, parameters, and profiles 174 responsive to a propagated signal, so that a device connected to a network 107 may communicate voice, video or data over the network 107. Further, the instructions 174 may be transmitted or received over the network 107 via the network interface device 109.

The information handling system 100 may include a set of instructions 174 that may be executed to cause the computer system to perform any one or more of the methods or computer-based functions disclosed herein. As an example, instructions 174 may execute an intelligent face framing management system 170, software agents, the MMCA 140, various APIs such as 160 or the multimedia framework pipeline and infrastructure platform that may provide a framework for the systems, or other aspects or components of the embodiments herein. Various software modules comprising application instructions 174 may be coordinated by an operating system (OS), and/or via an application programming interface (API). An example operating system may include Windows®, Android®, and other OS types. Example APIs may include Win 32, Core Java API, or Android APIs.

The disk drive unit 106 and the intelligent face framing management system 170 may include a computer-readable medium 172 in which one or more sets of instructions 174 such as software may be embedded. Similarly, main memory 101 and static memory 102 may also contain a computer-readable medium for storage of one or more sets of instructions, parameters, or profiles 174. The disk drive unit 106 and static memory 102 may also contain space for data storage. Further, the instructions 174 may embody one or more of the methods or logic as described herein. For example, instructions relating to the intelligent face framing management system 170, code instructions of a trained neural network, software algorithms, processes, and/or methods may be stored here. In a particular embodiment, the instructions, parameters, and profiles 174 may reside completely, or at least partially, within the main memory 101, the static memory 102, and/or within the disk drive 106 during execution by the processor 110 of information handling system 100. As explained, some of or all the intelligent face framing management system 170 may be executed locally or remotely. The main memory 101 and the processor 110 also may include computer-readable media.

Main memory 101 may contain computer-readable medium, such as RAM in an example embodiment. An example of main memory 101 includes random access memory (RAM) such as static RAM (SRAM), dynamic RAM (DRAM), non-volatile RAM (NV-RAM), or the like, read only memory (ROM), another type of memory, or a combination thereof. Static memory 102 may contain computer-readable medium (not shown), such as NOR or NAND flash memory in some example embodiments. The intelligent face framing management system 170 may be stored in static memory 102, or the drive unit 106 on a computer-readable medium 172 such as a flash memory or magnetic disk in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The information handling system 100 may further include a power management unit (PMU) 103 (a.k.a. a power supply unit (PSU)). The PMU 103 may manage the power provided to the components of the information handling system 100 such as the processor 110 (e.g., CPU, GPU, VPU, GNA, etc.), a cooling system such as a bank of fans, one or more drive units 106, the video/graphic display device 120, and other components that may require power when a power button has been actuated by a user. In an embodiment, the PMU 103 may be electrically coupled to the bus 108 to provide this power. The PMU 103 may regulate power from a power source such as a battery 104 or A/C power adapter 105. In an embodiment, the battery 104 may be charged via the A/C power adapter 105 and provide power the to the components of the information handling system 100 when A/C power from the A/C power adapter 105 is removed.

The information handling system 100 may also include the intelligent face framing management system 170 that may be operably connected to the bus 108. The intelligent face framing management system 170 computer readable medium 172 may have access to and be stored in data storage. The intelligent face framing management system 170 may, according to the present description, be executable code to perform tasks related to generating optimized face framing adjustments to intelligently select a user-gaze-centered camera, recenter, or resize images of a user within videoframes captured by the user-gaze-centered camera or a default camera during execution of a user session of the MMCA 150. In an embodiment, the intelligent face framing management system 170 may be code instructions and operate with the main memory 101, the processor 110, the multimedia processing control API 160, various embedded controllers and the NID 109 via bus 108, and several forms of communication may be used, including ACPI, SMBus, a 24 MHZ BFSK-coded transmission channel, or shared memory. Driver software, firmware, controllers, and the like may communicate with applications on the information handling system 100.

Driver software, firmware, controllers and the like may communicate with applications on the information handling system 100, for example via the input/output driver 123, which may be a streaming media driver or other drivers for I/O devices, or the sensor driver 131. Similarly, video display driver software, firmware, controllers and the like may communicate with applications on the information handling system 100, for example, via the display driver 121. In other embodiments, dedicated hardware implementations such as application specific integrated circuits, programmable logic arrays and other hardware devices may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein may be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module may include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module may also include a combination of the foregoing examples of hardware or software. In an embodiment an information handling system 100 may include an integrated circuit or a board-level product having portions thereof that may also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another may communicate directly or indirectly through one or more intermediaries.

Figure 2:
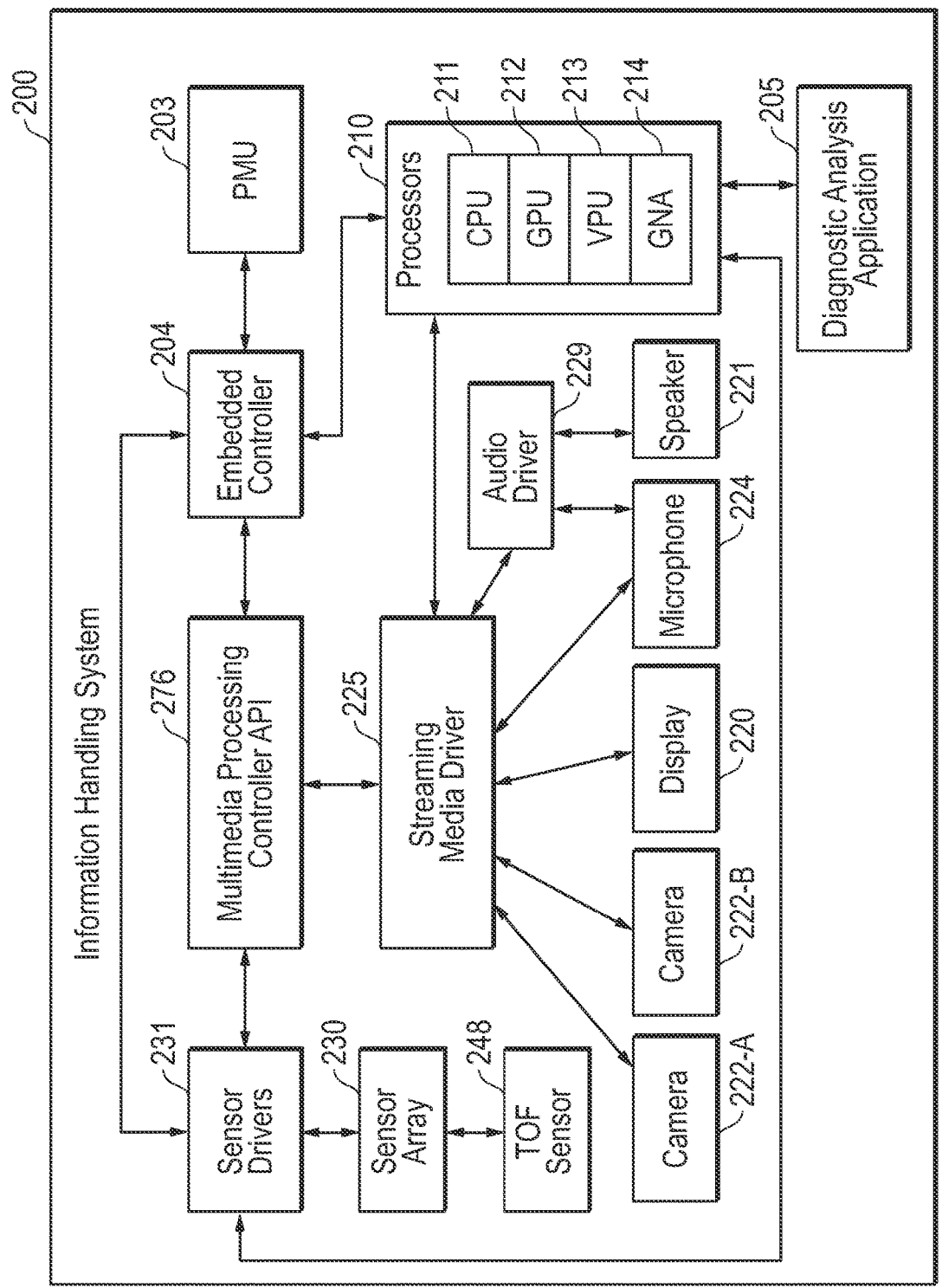
FIG. 2 is a block diagram illustrating various drivers and processors in communication with a plurality of peripheral devices of an information handling system according to an embodiment of the present disclosure.

FIG. 2 is a block diagram illustrating various drivers and processors in communication with a plurality of peripheral devices, software applications, and one or more processors according to an embodiment of the present disclosure. As described herein, the intelligent face framing management system may intelligently crop, resize, or zoom videoframes including images of a user, as captured by a selected gaze-centered camera or default camera, to center the user and normalize the size of the user's face so as to appear at a consistent distance as selected by a user or a default determination that may most effectively communicate the user's facial expressions during user sessions for an MMCA.

A neural network of the intelligent face framing management system in an embodiment may make such appearance optimization determinations for each user of an individual information handling system (e.g., 200) separately. Such a determination may be made based upon a plurality of inputs including captured videoframes including images of a user, data describing hardware and software capabilities and performance metrics of the information handling system at issue, default media capture instructions and default AV processing instruction module settings generated by the MMCA, and various sensor readings taken at the information handling system.

These neural network input values may be gathered from a plurality of sensors, peripheral devices, and diagnostic applications. For example, hardware performance metrics describing total processing load at one or more processors 210 may be gathered via an embedded controller 204 in an embodiment. The embedded controller 204 may also gather information describing state of charge for a power management unit 203, which may include a battery and an AC adapter, as described with reference to FIG. 1. Such state of charge information may be gathered by the embedded controller 204 in an embodiment while the information handling system 200 is operating solely on battery power, and when the PMU 203 is receiving power via the AC adapter. The embedded controller 204 in an embodiment may gather such metrics through direct communication with the processor 210 (e.g., CPU, GPU, VPU, GNA, etc.) and with the power management unit (PMU) 203. In some embodiments, such communication may occur in kernel mode.

As described in greater detail with reference to FIG. 5, the intelligent face framing management system may be integrated, in whole or in part, in some embodiments within an information handling system performance optimizer application located remotely from the information handling system 200. In such an embodiment, the information handling system performance optimizer application may operate to manage security credentials, connectivity credentials, performance optimization, software updates, and other various routine computing maintenance tasks for a plurality of information handling systems (e.g., including 200) owned by an enterprise business or produced by a single manufacturer. The Dell® Optimizer® software application is one example of such an information handling system performance optimizer application. The information handling system performance optimizer application in such an embodiment may communicate with the embedded controller 204 to receive high-level hardware performance metrics from each of the plurality of information handling systems (e.g., including 200) it manages during routine out-of-band communications between the information handling system performance optimizer application and all managed information handling systems. Such out-of-band communications with the embedded controller 204 in an embodiment may be used to check security credentials or performance statistics for the information handling systems (e.g., 200), or to push software or firmware updates to the information handling systems, for example. During such routine maintenance, the information handling system performance optimizer application may accumulate, sort, and analyze all performance metrics received from all managed information handling systems (e.g., 200), including processing load across all available processors 210 (e.g., CPU, GPU, VPU, GNA), default settings associating specific processors (e.g., 210) with specific tasks, or state of remaining charge of the battery incorporated within the PMU 203, for example. Out-of-band communications initiated in such a way between the embedded controller 204 and the information handling system performance optimizer application may be via a wireless network such as Wi-Fi or cellular, or via wired connection. Such out-of-band communications operate without need for Operating System intervention or function and may operate behind the scenes to ensure optimized appearance measures such as generating or transmitting user appearance anomaly notification messages or videoframe user image adjustment functions for managed information handling systems in some embodiments such as when the intelligent face framing management system operates in whole or in part as a remote service from the user's information handling system.

As another example of gathering inputs for a neural network of the intelligent face framing management system, software performance metrics may be generated at a diagnostic analysis application 205, based at least in part on communication between the diagnostic analysis application 205 and the processor 210. Such a diagnostic analysis application 205 may operate to gather metrics describing CPU usage or load, as well as a breakdown of the CPU usage attributable to each of a plurality of applications (e.g., including a MMCA) running via the operating system of the information handling system 200. In some embodiments, the diagnostic analysis application 205 may provide similar metrics for other types of processors for the information handling system, including, for example, a graphics processing unit (GPU), vision processing unit (VPU), or gaussian neural accelerator (GNA). One example of such a diagnostic analysis application 205 in an embodiment may include the Microsoft® Diagnostic Data Viewer® software application. As described in greater detail with respect to FIG. 5, these software performance metrics may be generated at the diagnostic analysis application 205 and transmitted to the neural network of the intelligent face framing management system via multimedia processing controller API 276 for determination if any optimized face framing adjustments may cause involved AV processing instruction modules or other AV processing instruction modules to be better executed at an alternative processor.

In yet another example of gathering inputs for a neural network of the intelligent face framing management system, various sensor readings may be taken by the information handling system 200 and communicated to the intelligent face framing management system. More specifically, the information handling system 200 may include one or more sensors within a sensor array 230. Such sensors may include, for example, an ambient light sensor or a color sensor as well as other sensors of the information handling system that may be relevant to operation of the MMCA (e.g., a hall effect sensor or hinge rotation sensor, accelerometer, gyroscope, orientation sensor, light sensors, IR cameras, etc.).

In yet another example of gathering inputs for the intelligent face framing management system, various sensor readings, such as a TOF sensor 248 or other proximity sensors, may be taken by the information handling system 200 and communicated to the intelligent videoframe privacy monitoring management system. Any TOF sensor 248 may be used and may include laser, visual spectrum, near infrared (IR), or IR spectrum camera TOF sensors to determine distance data of a user, other persons or objects, or background elements based on time for light from a light source in a known location to bounce off of a person or object and be sensed by a camera sensor such as a charge coupled device (CCD). The TOF sensor 248 may have a light source and CCD or other camera sensor located in a known position relative to the camera system 222 used to capture videoframes according to an example embodiment. In some embodiments, camera system 222 may be part of the TOF sensor 248. Determination of distances in a space in front of the camera system 222 may be conducted via scanning such as with a light detection and ranging (LIDAR) system in one example embodiment. An example TOF sensor 248 may be an Intel® RealSense™ system in some embodiments.

Other examples of sensors within the sensor array 230 may include light sensors, infrared (IR) cameras, or geographic position sensors (e.g., GPS units). In some embodiments, one or more modules of the network interface device described with reference to FIG. 1 may constitute one of the sensors within the sensor array 230. For example, a GPS module may determine GPS coordinates for location of an information handling system. In another example, an antenna front end system of the network interface device may operate to determine location based on connection to one or more Wi-Fi networks or cellular networks. The GPS coordinates or other location identification of the information handling system 200 and identification of one or more Wi-Fi networks or cellular networks to which the information handling system 200 connects may constitute sensor readings gathered at the sensor drivers 231 in an embodiment. All sensor readings from sensors within the sensor array 230 in an embodiment may be transmitted to the sensor drivers 231. As described in greater detail with respect to FIG. 5, these sensor readings may be transmitted from the sensor drivers 231 to the neural network of the intelligent face framing management system via the processor 210 and a multimedia processing controller API 276. Location sensors may indicate home or office use of an information handling system to assist in determining whether a videoconference call is a business meeting or a casual event, along with assessment of invited participants, to determine in some embodiments a type of optimized appearance filter adjustment that may be output by the intelligent face framing management system executing a trained neural network.

In still another example of gathering inputs for a neural network of the intelligent face framing management system, default media capture instructions and default AV processing instruction module settings may be gathered via a streaming media driver 225 and transmitted to the intelligent face framing management system. Default media capture instructions in an embodiment may be generated by the MMCA, or may be preset by the manufacturer of the camera, microphone, or information handling system 200. It is contemplated that any media capture instructions directing the capture by the camera of images or video or directing the capture by the microphone of audio that do not constitute optimized media capture instructions generated based on the output of the neural network described herein may constitute default media capture instructions. Such default media capture instructions and optimized media capture instructions may dictate the method by which such audio, image, and video samples are captured. For example, media capture instructions may identify the frames per second at which the camera 222 may capture images for generation of a video, the resolution at which the camera captures and stores such images, the number of key frames in each preset time period, zoom settings, pan settings, or instructions to center the captured image around an identified object. As another example, media capture instructions may identify the bit rate at which the microphone 224 records and saves captured audio samples.

It is contemplated that the information handling system 200 may include one or more cameras, such as 222-A and 222-B (e.g., one camera for each of a plurality of videoconferencing displays oriented at different angles to a user), one or more displays (e.g., 220), one or more speakers 221, or one or more microphones 224. The streaming media driver 225 in an embodiment may be capable of gathering the default or current media capture settings pursuant to which the camera 222 or microphone 224 are capturing images and audio, respectively. The streaming media driver 225 may also gather audio samples recorded at the microphone 224 as another input into the neural network. For example, received audio samples may be played back in a videoconference via one or more speakers 221.

In some embodiments, default media capture instructions may be stored at the streaming media driver 225, which may operate to direct operation of the camera 222 or microphone 224. As described in greater detail with respect to FIG. 5, these default media capture instructions may be transmitted from the streaming media driver 225 to the neural network of the intelligent face framing management system via multimedia processing controller API 276. In an embodiment in which the trained neural network outputs optimized face framing adjustments to select a gaze-centered video camera, these optimized face framing adjustments may be transmitted to the streaming media driver 225 to direct the camera (e.g., 222-A or 22-B) identified within the optimized face framing adjustments to capture videoframes including images of the user during the videoconference session.

Upon determination of optimized face framing adjustments via the intelligent face framing management system, these optimized face framing adjustments may be transmitted to various components of the information handling system 200. For example, as described in greater detail with respect to FIG. 5, optimized face framing adjustments to crop or zoom an image of the user in the videoframe to center the face image in the captured videoframe may be transmitted to the multimedia framework pipeline and infrastructure platform via the multimedia processing control API 276. Such a multimedia processing control API 276 in an embodiment may transmit the optimized media capture instructions to the streaming media driver 225 in one embodiment.

Figure 3:
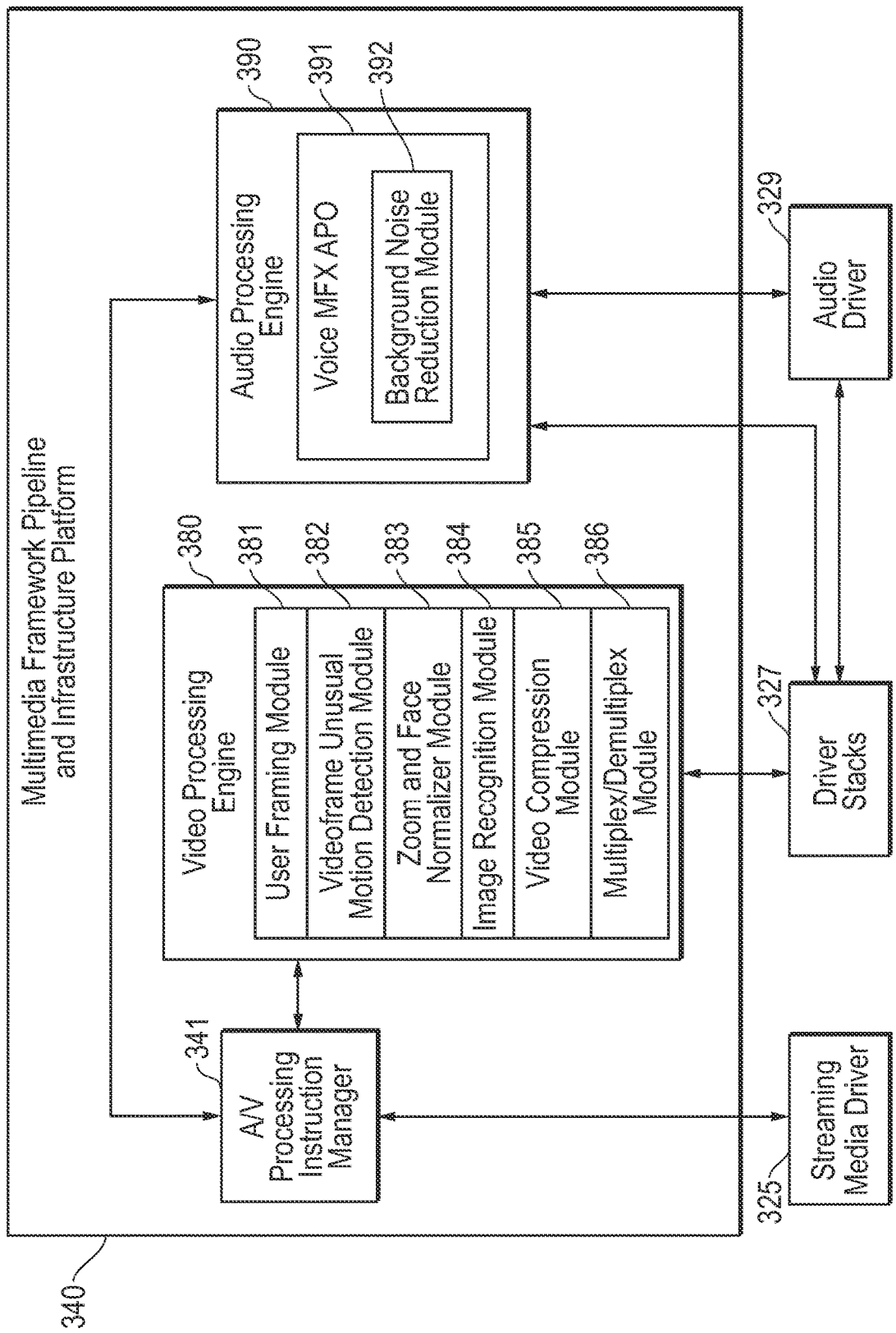
FIG. 3 is a block diagram illustrating a multimedia framework pipeline and infrastructure platform of an information handling system according to an embodiment of the present disclosure.

FIG. 3 is a block diagram illustrating a multimedia framework pipeline and infrastructure platform in communication with a plurality of drivers in order to process received media samples according to an embodiment of the present disclosure. As described herein, the intelligent face framing management system may optimize various settings for processing of media samples captured at or received by an information handling system, during execution of user sessions for a MMCA. The intelligent face framing management system may intelligently crop, resize, or digitally zoom videoframes including images of a user, as captured by a selected gaze-centered camera or default camera, to center the user and normalize the size of the user's face so as to appear according to a size selected by a user via a GUI or to meet a default size that may most effectively communicate the user's facial expressions during user sessions for an MMCA.

The multimedia framework pipeline and infrastructure platform 340 may process media samples captured at the information handling system executing the multimedia framework pipeline and infrastructure platform 340 in one aspect of an embodiment. An example of such a multimedia framework pipeline and infrastructure platform 340 may include the Microsoft @ Media Foundation Platform® for Windows®. The multimedia framework pipeline and infrastructure platform 340 in an embodiment may manage audio and video playback quality, interoperability, content protection, and digital rights management. The multimedia framework pipeline and infrastructure platform 340 may operate to retrieve audio and video samples from a media source, perform one or more processing methods on the retrieved audio and video samples, multiplex the audio and video samples together to form a processed media sample, and transmit the processed media sample to a media sink.

The multimedia framework pipeline and infrastructure platform 340 in an embodiment may include an audio/visual (AV) processing instruction manager 341, a video processing engine 380, and an audio processing engine 390. The video processing engine 380 and audio processing engine 390 may each perform AV processing methods or algorithms to transform media samples. Several of such methods may be performed serially to transform a single media sample in an embodiment, such as via a chaining algorithm. The AV processing instruction manager 341 in an embodiment may schedule or otherwise management performance of each of these methods, in turn.

In one aspect of an embodiment, a camera or microphone operably connected to the information handling system may operate as the media source. In such an embodiment, the AV processing instruction manager 341 in an embodiment may operate to retrieve a media sample from a media source, based on a media capture instruction. The AV processing instruction manager 341 may transmit a media capture instruction to the streaming media driver 325 in an embodiment. As described in greater detail with respect to FIG. 5, the multimedia framework pipeline and infrastructure platform 340 may also be in communication with the MICA and a multimedia processing control API 376. Via such communications, the multimedia framework pipeline and infrastructure platform 340 may receive default media capture instructions from the MMCA. The multimedia framework pipeline and infrastructure platform 340 may also receive optimized face framing adjustments identifying a gaze-centered camera from the trained intelligent face framing management system via the multimedia processing control API 376. As such, the media capture instructions communicated from the AV processing instruction manager 341 to the streaming media driver 325 in an embodiment may include default media capture instructions or optimized face framing adjustments to those instructions when the trained intelligent face framing management system is operating to improve information handling system performance.

The streaming media driver 325 in such an embodiment may receive video or audio samples captured by peripheral cameras or microphones in communication therewith, according to default media capture instructions or optimized face framing adjustments to those instructions, as described with reference to FIG. 2. In another embodiment, the audio driver 329 may receive audio samples captured by a microphone in communication therewith, according to such received media capture instructions. In such an embodiment, the audio driver 329 may operate as a mini-driver or child device to the parent device streaming media driver 325. The streaming media driver 325 may be in communication with the AV processing instruction manager 341 via one or more ports (e.g., as described in greater detail with respect to the device proxy 442 of FIG. 4) such that video or audio samples received by the streaming media driver 325 may be transmitted to the AV processing instruction manager 341 in an embodiment. The audio driver 329 may be in communication with the AV processing instruction manager 341 such that audio samples received by the audio driver 329 may be transmitted to the AV processing instruction manager 341 (e.g., via the audio processing engine 390, or via the streaming media driver 325) in an embodiment. In such a way, the AV processing instruction manager 341 may direct retrieval of a video sample captured at a camera operably connected to information handling system and retrieval of an audio sample captured at a microphone operably connected to information handling system.

As described herein, the multimedia framework pipeline and infrastructure platform 340 may also operate to perform one or more processing methods on the retrieved audio and video samples coming from another video conference participant. The AV processing instruction manager 341 in an embodiment may operate to apply one or more AV processing instruction modules to the retrieved sample. The AV processing instruction manager 341 may direct whether or the order in which various AV processing instruction modules, are employed on media samples. The video processing engine 380 may operate to apply one or more video processing AV processing instruction modules to a video sample, each implemented by a separate module, according to execution instructions received from the AV processing instruction manager 341. The audio processing engine 390 may operate to apply one or more audio processing AV processing instruction modules to an audio sample, each implemented by a separate audio processing object, according to execution instructions received from the AV processing instruction manager 341.

In an embodiment in which the camera or microphone operably connected to the information handling system operates as the media source, the one or more AV processing instruction modules may include application of a codec via a video compression module 384 to compress each of the audio sample and the video sample as required for transmission of media samples across the internet, and playback of those media samples by a MMCA, and a multiplex/demultiplex module 385 to coalesce the compressed audio sample and compressed video sample into a processed, encoded (e.g., by a codec) media sample. Other processing methods in an embodiment may be dictated by one or more features of the MMCA, or optimized instructions received from the intelligent face framing management system, as described herein.

The video processing engine 380 may operate at the direction of the AV processing instruction manager 341 to perform one or more of the algorithms associated with the plurality of modules within the video processing engine 380. Several AV processing instruction modules are contemplated for execution during operation of the MMCA, such as a user framing module 381 operating to identify a user's face and center the face within the captured videoframes, a videoframe unusual motion detection module 382 to determine when the user's position with respect to a camera capturing videoframes of the user changes due to movement, a zoom and face normalizer module 383 to digitally zoom, crop, enlarge, or scale down various captured images constituting the captured video sample to normalize the size of the user's face across each of the captured images, or other modules not depicted in FIG. 3, such as shading adjustment modules, color blending modules, and others.

In embodiments herein, the video processing engine 380 may receive one or more output optimized face framing adjustments from a trained intelligent face framing management system neural network. The optimized face framing adjustments in an embodiment may operate to zoom and adjust the size of the face image relative to the area of the displayed field of view in the captured videoframe to a size percentage range threshold of the face image in the captured videoframe, in an example. In another example, the optimized face framing adjustments in an embodiment may operate to center the face image location in the captured videoframe. In yet another example embodiment, the optimized face framing adjustments may operate to select a gaze-centered video camera from the plural video cameras having the minimum deviation from a central gaze of the user in the user's image in the captured videoframe.

In yet other embodiments, the video processing engine 380 may receive one or more output optimized face framing adjustments from a trained intelligent face framing management system neural network to alter a user's image by invoking one or more AV processing instruction modules, such as 381-386 or other AV processing instruction modules to process the captured videoframes as discussed below. Additionally, the video processing engine 380 may also invoke or execute instructions of one or more AV processing instruction modules 381-386 or others not shown when conducting a videoconference session via the MMCA, whether or not an intelligent face framing management system is executing as well in various embodiments herein.

Other modules not shown in FIG. 3 may apply further AV processing instruction modules to video samples in some embodiments. For example, a boundary detection module may operate to detect the boundaries of the user within each captured image of a captured video sample, and a virtual background module may apply a virtual background around the detected user boundary. It is contemplated other AV processing instruction modules known in the art may also be employed, such as a hand detection algorithm, for example.

The compression module 385 in an embodiment may perform one or more algorithms or digital transforms to compress or decompress the received and processed video sample. Various compression algorithms may be employed in various embodiments. In some embodiments, the compression algorithm used may conform to one or more standards, selected or identified for use by the MMCA. For example, the MMCA may require all media samples transmitted to sinks (e.g., Universal Resource Identifiers or URIs) accessible by various agents or APIs of the MMCA executing across a plurality of information handling systems, adhere to the Motion Picture Experts Group 4 (MPEG-4) standard established by a Joint Technical Committee (JTC) of the International Organization for Standardization and International Electrotechnical Commission (IOS/IEC). This is only one example of a standard required by the MMCAs in an embodiment, and is meant to be illustrative rather than limiting. It is contemplated the video processing engine 380 in an embodiment may include various modules for encoding or decoding video samples or media samples using any known, or later developed standards.

The MPEG-4 standard may define one or more algorithms or AV processing instruction modules (e.g., reduced-complexity integer discrete cosine transform) that may be used to compress and decompress video samples or audio samples. For example, the H.264 Advanced Video Coding (AVC), defined by part 10 of the MPEG-4 standard is the most widely used codec by video developers. Other video compression algorithms available under the MPEG-4 standard may also define 3D graphics compression (e.g., part 25), web video coding (e.g., part 29), internet video coding (e.g., part 33), and video coding for browsers (e.g., part 31). Each of these compression algorithms may be associated with different processing requirements for coding or decoding streaming media data in an embodiment. For example, the H.264 compression algorithm may require more processing resources than the video coding for browsers compression algorithm. Thus, the load placed on the processor executing such algorithms in an embodiment may be increased or decreased by choosing one of these compression algorithms over another.

Upon application of all other AV processing instruction modules to be applied in an embodiment, the multiplex module 386 may combine or coalesce the processed video sample and the processed audio sample into a single, processed and encoded (e.g., via the video compression module 385) media sample for transmission. The same, similar, or complimentary AV processing instruction modules may be performed on remotely captured media samples received at the information handling system for demultiplexing, decoding, and display or presentation on the information handling system, as described in greater detail below. The AV processing instruction modules 381-386 and others not shown in FIG. 3 may comprise machine executable code instructions executing at various controllers or processors of the information handling system. Any one or more of these AV processing instruction modules may be routinely applied pursuant to instructions received from the MMCA (e.g., boundary detection, virtual background) and may be applied to a captured video sample in an embodiment. Further, each of the algorithms executed by these AV processing instruction modules may be implemented in any order. In some embodiments, one or more of the algorithms executed by these modules require a particular order.

The audio processing engine 390 may operate to process audio samples, and may include, for example, a voice mode effects audio processing object 391 and an audio compression module. The audio compression module in an embodiment may apply a compression algorithm or codec to the captured audio sample to compress it. Several audio codecs may be used under part 3 of the MPEG-4 standard, including Advanced Audio Coding (AAC), Audio Lossless Coding (ALS), and Scalable Lossless Coding (SLS), among others. As with the video compression algorithms described directly above, each of these audio compression algorithms may be associated with different processing requirements for coding or decoding streaming audio samples in an embodiment. Thus, the choice of audio compression algorithm may affect load placed on the processor executing such algorithms in an embodiment.

The voice mode effects audio processing object 391 in an embodiment may include modules for application of other digital signal processing effects, including, for example, a background noise reduction module 392. In an embodiment, the background noise reduction module 392 may operate to isolate the user's voice from surrounding background noise and either amplify the user's voice, or reduce or remove the background noise. In other embodiments, the voice mode effects audio processing object 391 may include other modules for further digital signal processing effects, including voice modulation, graphic equalization, reverb adjustment, tremolo adjustment, acoustic echo cancellation, or automatic gain control. It is contemplated any known or later developed digital signal processing effects commonly used in MMCAs may also be executed as one or more modules within the voice mode effects audio processing object 391 in various embodiments. Any one or more of these voice mode effects audio process object modules (e.g., 392) may be applied to a captured audio signal in an embodiment. In other embodiments, the audio processing engine 390 may perform compression of the audio sample via the audio compression module. As described directly above, following processing and encoding or compression of the audio sample in such a way, the AV processing instruction manager 341 may instruct the video processing engine 381 to multiplex or combine the processed and encoded video sample with the processed and encoded audio sample to generate a processed and encoded media sample. In such a way, the video processing engine 380 and audio processing engine 390, operating pursuant to execution instructions received from the AV processing instruction manager 341, may combine an audio sample with a video sample, both captured at the information handling system, into a single, processed and encoded media sample, such that the processed and encoded media sample may be transmitted or streamed to other information handling systems via a network (e.g., the world wide web).

As also described herein, the multimedia framework pipeline and infrastructure platform 340 may operate to transmit a media sample to a media sink. In an embodiment in which the camera or microphone operably connected to the information handling system operates as the media source, an information handling system located remotely from information handling system and engaged in the same user session for the MMCA as information handling system may operate as the media sink. In such an embodiment, the multimedia framework pipeline and infrastructure platform 340 may stream the processed and encoded media sample over a network (e.g., world wide web) via a URI defined by the MMCA, such that a plurality of other information handling systems engaged in the same user session for the MMCA may access the streaming media sample.

FIG. 4

Figure 4:
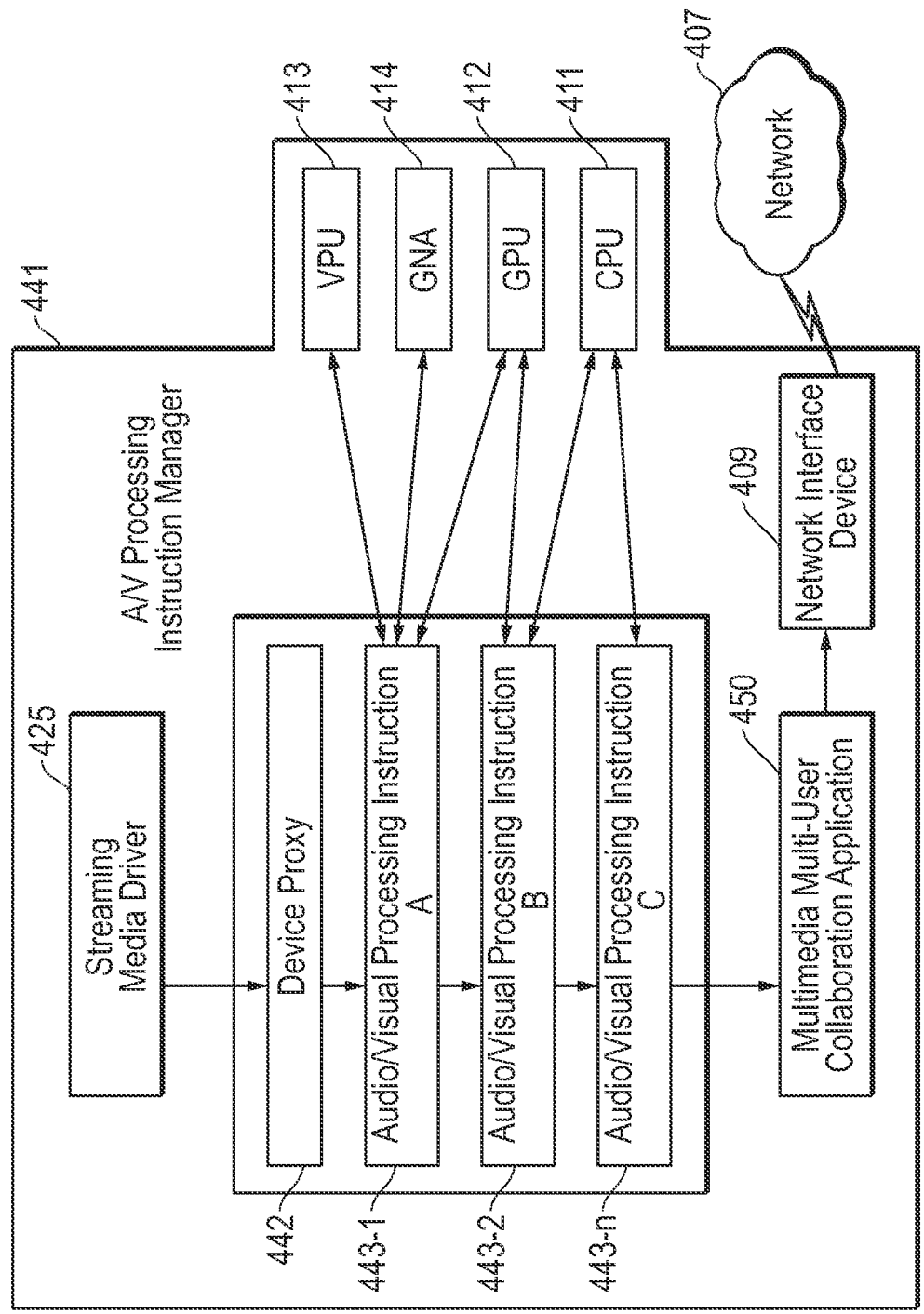
FIG. 4 is a block diagram illustrating audio/visual (AV) processing instruction manager for optimizing information handling system operation of a multimedia, multi-user collaboration application according to an embodiment of the present disclosure.

FIG. 4 is a block diagram illustrating an AV processing instruction manager operating to process media samples transmitted between a streaming media driver and an MMCA of an information handling system according to an embodiment of the present disclosure. The AV processing instruction manager 441 of a multimedia framework pipeline and infrastructure platform may operate to retrieve audio and video samples (e.g., videoframes) from a camera or microphone, perform one or more processing methods on the retrieved audio and video samples, multiplex the audio and video samples together to form a processed media sample, and transmit the processed media sample from a media source information handling system to a media sink information handling system.

The information handling system may act as a media sink and a media source, depending upon the location at which such media samples are captured. For example, in an embodiment in which the camera of an information handling system captures video samples and a microphone of the information handling system captures audio samples, both pursuant to media capture instructions received by the AV processing instruction manager 441, the information handling system may act as the media source and transmit media samples to a media sink information handling system.

In an embodiment in which the information handling system acts as a media source, the streaming media driver 425 (or other drivers) may execute media capture instructions received from the AV processing instruction manager 441 to instruct capture of video samples via one or more cameras and capture of audio samples via one or more microphones of information handling system. As described herein, such media capture instructions may include default media capture instructions stored at the streaming media driver 425 or other drivers, default media capture instructions generated by the MMCA 450, or optimized face framing adjustments to these default media capture instructions identifying a gaze-centered camera for selection, as generated by the intelligent face framing management system.

Upon capture of such video samples and audio samples in an embodiment, the streaming media driver 425 (or other drivers) may transmit the captured video and audio samples to the AV processing instruction manager 441 via a device proxy 442. The device proxy 442 in an embodiment may comprise code instructions operating at a controller. In an embodiment, the device proxy 442 may route or map connections between physical pins of the streaming media driver 425 (or other drivers) and the AV processing instruction manager 441. The streaming media driver 425 may comprise firmware or software code instructions executable to allow communication between various media hardware (e.g., camera, microphone, speakers, display) and the operating system (OS). The AV processing instruction manager 441 in an embodiment may comprise code instructions executable within the OS environment via one or more processors (e.g., VPU 413, GNA 414, GPU 412, or CPU 411) of the information handling system. As the AV processing instruction manager 441 manages execution of either a video sample or an audio sample in such an embodiment, the AV processing instruction manager 441 may employ the device proxy 442 to retrieve the video sample from one of the physical pins within a driver operably connected to the camera prior to execution of a video processing method. Similarly, the AV processing instruction manager 441 may employ the device proxy 442 to retrieve the audio sample from one of the physical pins within a driver operably connected to the microphone prior to execution of an audio processing method. The communication between the streaming media driver 425 and the device proxy 442 in such an embodiment may be executed by the AV processing instruction manager 441 executing code in kernel mode on the CPU 411 in an embodiment.

The AV processing instruction manager 441 in an embodiment may apply one or more AV processing instruction modules, each representing processing methods, on the audio sample and the video sample. For example, the AV processing instruction manager 441 in an embodiment may perform an AV processing instruction module A 443-1 for providing features specific to the MMCA 450, perform AV processing instruction module B 443-2 for compressing an audio sample or a video sample, one or more additional AV processing instruction modules, and perform any additional AV processing instruction module C 443-n, such as multiplexing the processed and encoded audio and video samples together to form a processed and encoded media sample. In an example embodiment, the AV processing instruction modules 443-1 to 443-n may be any number of AV processing instruction modules that may be executed via the AV processing instruction manager 441 for the MMCA 450 in processing captured audio or visual data by the video processing engine or the audio processing engine. In example embodiments, any of the AV processing instruction modules 443-1 to 443-n may correspond to the AV processing instruction modules shown or described in FIG. 3 or elsewhere in the present disclosure and may be invoked or adjusted by the intelligent face framing management system issuing an optimized face framing adjustment that provides for an alteration of a user's image in the videoframes. The intelligent face framing management system may utilize one or more trained neural networks, such as object recognition machine learning to identify a user's features, for example a nose, face, gaze, or head position/angle, in captured videoframes. In such an embodiment, the processed and encoded media sample may then be transmitted or streamed to the MMCA 450, where it will be streamed to a URI in the network 407 via the network interface device 409. The information handling system will thus function as a media source.

The information handling system in an embodiment may include a plurality of processors, including, for example, a Central Processing Unit (CPU) 411, a Graphics Processing Unit (GPU) 412, a Vision processing unit 413, and a Gaussian neural accelerator (GNA) 414. The CPU 411 in an embodiment may execute the bulk of tasks relating to all software applications running via the operating system (OS), which may include the MMCA 450, the multimedia framework pipeline and infrastructure platform incorporating the AV processing instruction manager 441, as well as several others. Increased processing load placed on the CPU 411 by the AV processing instruction manager 441 during execution of a user session for the MMCA 450 may decrease the processing resources left available for all other applications also running at the OS, which may include word processing applications (e.g., Microsoft® Word®), presentation applications (e.g., Microsoft® PowerPoint®), e-mail applications, web browsers, and other applications routinely used in conjunction with the MMCA throughout a typical workday.

The GPU 412 in an embodiment may be a processor specialized for rapidly manipulating and altering AV data in memory to accelerate the creation of a video sample using a plurality of captures images stored in a frame buffer. GPU 412 may be more efficient at manipulating such stored video samples during image processing performed by one or more of the AV processing instruction modules (e.g., 443-1, 443-2, and 443-n) in an embodiment. The VPU 413 in an embodiment may be specialized for running machine vision algorithms such as convolutional neural networks (e.g., as used by the user framing module, super resolution module, zoom and face normalizer module, or eye contact correction modules described with reference to FIG. 3). The GNA 414 in an embodiment may comprise low-power co-processor to the CPU, or a System on a Chip (SoC) that can run under very low-power conditions to perform a specialized task, such as real-time translations ongoing conversations, or various other audio and video processing methods represented by any one of the AV processing instruction modules 443-1, 443-2, or 443-n. The GNA 414 may operate in an embodiment to offload continuous inference workloads from the CPU 411, GPU 412, or VPU 413, including but not limited to noise reduction or speech recognition, to save power and free CPU 411 resources.

Each of the AV processing instruction modules (e.g., 443-1, 443-2, and 443-n) in an embodiment may be sets of algorithms or code instructions executed via the operating system (OS), using one of the processors of the information handling system for modification of video data or audio data relating to streaming video conferencing applications. It is understood that any number of AV processing instruction modules is contemplated in discussing 443-1 through 443-n. A single processor may execute each of the AV processing instruction modules (e.g., 443-1, 443-2, and 443-n), a subgroup thereof, or may even execute a single AV processing instruction, according to various embodiments. The AV processing instruction manager 441 in an embodiment may determine which processor to access in order to execute each AV processing instruction (e.g., 443-1, 443-2, and 443-n) in an embodiment, based on offload instructions. For example, in an embodiment in which the information handling system acts as the media source, the AV processing instruction manager 441 may access the VPU 413 or the GNA 414 to execute various video or audio processing algorithms supported by the features of the MMCA, as represented by AV processing instruction A 443-1, pursuant to an optimized offload instruction to avoid executing that AV processing instruction using the GPU 412 or CPU 411. As another example in such an embodiment, the AV processing instruction manager 441 may access the GPU 414 or CPU 411 to execute the audio or video compression algorithm represented by AV processing instruction C 443-n. In yet another example in such an embodiment, the AV processing instruction manager 441 may access CPU 411 to multiplex the processed and encoded audio and video samples into a processed and encoded media sample.

Figure 5:
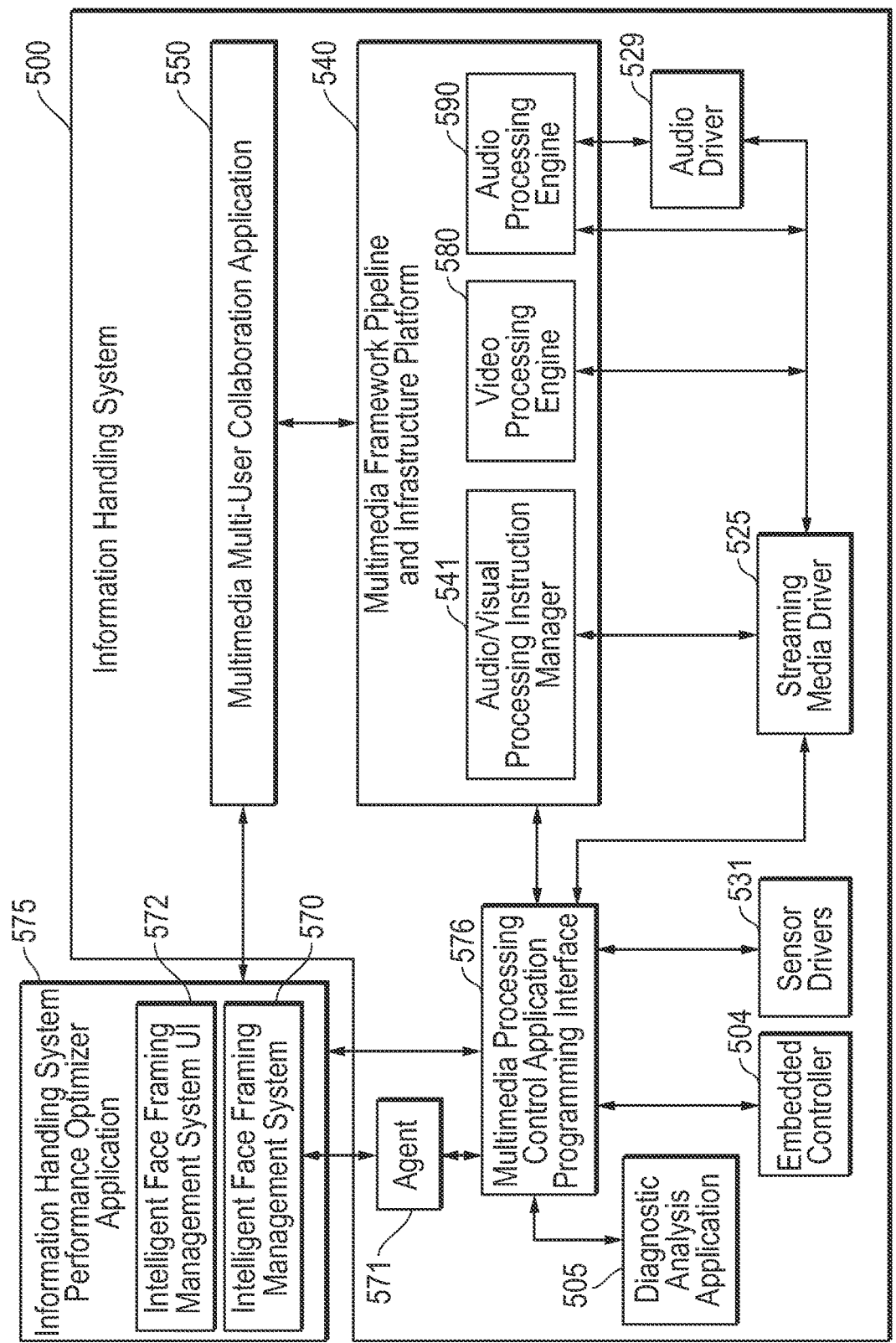
FIG. 5 is a block diagram illustrating a first embodiment of an intelligent face framing management system for optimizing information handling system usage of a multimedia, multi-user collaboration application by a user according to an embodiment of the present disclosure.

FIG. 5 is a block diagram illustrating a first embodiment of an intelligent face framing management system for intelligently monitoring or adjusting appearance of a user in captured media samples according to embodiments of the present disclosure. The intelligent face framing management system may use a trained neural network to identify user nose and face, and to intelligently crop, resize, or digitally zoom videoframes including images of a user, as captured by a selected gaze-centered camera or default camera, to center the user and normalize the size of the user's face so as to appear at a consistent distance as selected by a user or a default determination that may most effectively communicate the user's facial expressions during user sessions for an MMCA. As described herein, the intelligent face framing management system 570 are code instructions executing on one or more processors of an information handling system. Execution of the intelligent face framing management system may be, in whole or in part, on a remote information handling system such as one executing the information handling system performance optimizer application 575 in some embodiments. Execution of the intelligent face framing management system may be local to a user, in whole or in part, on one or more processors of information handling system 500 participating in a videoconference via multimedia multi-user collaboration system 550 in some embodiments. The intelligent face framing management system 570 in an embodiment may generate optimized face frame adjustments for cropping, resizing, or digitally zooming videoframes including images of a user, as captured by a selected gaze-centered camera or default camera, to center the user and normalize the size of the user's face.

The information handling system 500 described with reference to FIG. 5 may represent a transmitting, media source information handling system or a receiving, media sink information handling system in various embodiments. In still other embodiments, information handling system 500 may operate as both a transmitting, media source information handling system and a receiving, media sink information handling system, as may be the case for an information handling system transmitting video of one participant user while simultaneously executing code instructions for the MMCA 550 to display videos of other participants within a shared user session of a video conferencing system. In one example embodiment, the intelligent face framing management system 570 may be an application operating within the OS for the information handling system 500, including execution of a trained neural network for determining optimized face framing adjustments as described herein. For example, the information handling system 500 may execute any or all of the intelligent face framing management system 570 via a processor (e.g., processor 102 executing code instructions of the intelligent face framing management system 170, described with reference to FIG. 1) or embedded controller 504. In another example embodiment, the intelligent face framing management system 570 may be an application operating as part of an information handling system performance optimizer application 575 at an information handling system located remotely from the information handling system 500. In such an example embodiment, an agent 571, some or all of the intelligent face framing management system 570 may be operating at the information handling system 500. The agent 571 of the intelligent face framing management system 570 in such an embodiment may be in communication with the multimedia processing control API 576 via an internal bus of information handling system 500, and in communication with the information handling system performance optimizer application 575 via a network interface device, as described in greater detail with respect to FIG. 1.

The information handling system performance optimizer application 575 in an embodiment may also include an intelligent face framing management system user interface (UI) 572 allowing a user to enable or disable various features of the intelligent face framing management system 570. For example, the intelligent face framing management system UI may provide a GUI or other user interface accessible by the user of the information handling system 500, allowing the user to enable or disable the selection of a gaze-centered camera, the face normalization and zooming feature, or the face centering feature of the intelligent face framing management system 500 (e.g., as described in greater detail with respect to FIGS. 7 and 8). The intelligent face framing management system UI in some embodiments may allow the user to set the intelligent face framing management system to only engage these features upon certain trigger conditions, such as detection of the user speaking during a videoconference.

The user may also provide various settings via the intelligent face framing management system UI. For example, the user may provide normalization settings in which the user selects a desired face size with respect to the size of the videoframe. The user may also provide a size percentage threshold range which may define the degree to which the size of the user's face image may vary from the desired size described directly above, in order to trigger the intelligent face framing management system to automatically resize or digitally zooms the user's face image. This face image size percentage threshold range may be used to achieve the normalized face image size range in the captured videoframes as well as determine the sensitivity of triggering adjustments. The user may also provide sensitivity settings for the centering feature and the gaze-centered camera selection feature. For example, the user may define a preferred or desired degree to which the user may avert her gaze away from a camera to trigger the gaze-centered camera selection feature to select a new camera for capturing videoframes of the user during the videoconference. As another example, the user may define a preferred or desired distance the user's nose may be located from the center of the videoframe to trigger the intelligent face framing management system to recenter the user's image within the videoframe.

The information handling system performance optimizer application 575 in an embodiment may operate remotely from the information handling system 500 in an embodiment. For example, the information handling system performance optimizer application 575 may operate on a server, blade, rack, or cloud-based network maintained and controlled by the manufacturer of several information handling systems, or managed by an employer or enterprise owner of several information handling systems, including information handling system 500. In such an embodiment, the information handling system performance optimizer application 575 may operate to monitor certain performance metrics at each of the plurality of such information handling systems (e.g., including 500), perform firmware and software updates, confirm security credentials and compliance, and manage user access across the plurality of information handling systems (e.g., as owned by an employer or enterprise corporation, and including 500).

A neural network of the intelligent face framing management system 570 in an embodiment may make user image feature determinations (e.g., nose, face, head position, or gaze) for optimized face framing adjustments as described herein on a per information handling system (and per user) basis. Such a determinations may be made based upon a plurality of inputs including captured videoframes with current user images as well as inputs describing hardware and software performance metrics of the information handling system (e.g., 500) at issue, default media capture instructions and default AV processing instruction module setting settings generated by the MMCA (e.g., 550), various sensor readings taken at the information handling system (e.g., 500), and meeting metrics for the MMCA describing performance of that application and participation of the user of the information handling system during a user session. These neural network input values may be gathered from the video camera and a plurality of sensors, peripheral devices, and diagnostic applications, such as described in various example embodiments herein.

The multimedia processing control application programming interface 576 in an embodiment may operate, at least in part, as a hub, facilitating communication of each of these performance metrics, media capture instructions, and various sensor readings to the intelligent face framing management system 570 operating remotely, or agent 571 executing the intelligent face framing management system in whole or in part locally. For example, processing capabilities may indicate processor types available or Random Access Memory (RAM) or other memory capabilities of an information handling system. In a further example, hardware performance metrics describing total processing load at one or more processors may be gathered via an embedded controller 504 in an embodiment, and transmitted to the multimedia processing control API 576. The embedded controller 504 may also gather information describing state of charge for a power management unit, which may include a battery and an AC adapter, as described with reference to FIG. 1. The embedded controller 504 in an embodiment may gather such metrics through direct communication with the available processors (e.g., CPU, GPU, VPU, GNA, etc.) and with the power management unit (PMU). In some embodiments, such communication may occur in kernel mode.

In other embodiments, the information handling system performance optimizer application 575 may be in direct communication with the embedded controller 504 via out-of-band communications. In such embodiments, the hardware performance metrics (e.g., CPU load, current offload instructions, battery state of charge, current positional configuration of information handling system 500) may be determined by the embedded controller 504 in kernel mode and communicated to the information handling system performance optimizer application 575 directly during routine out-of-band communications between the information handling system performance optimizer application 575 and all managed information handling systems (e.g., including 500). Such out-of-band communications with the embedded controller 504 in an embodiment may be used to check security credentials or performance statistics for the information handling systems (e.g., 500), or to push software or firmware updates to the information handling systems, for example. During such routine maintenance, the information handling system performance optimizer application may accumulate, sort, and analyze all performance metrics received from all managed information handling systems (e.g., 500), including processing load across all available processors, default settings associating specific processors with specific tasks, or state of remaining charge of the battery incorporated within the PMU, for example. Out-of-band communications initiated in such a way between the embedded controller 504 and the information handling system performance optimizer application 575 may be via a wireless network such as Wi-Fi or cellular, or via wired connection.

As described herein, the multimedia processing control API 576 may operate, at least in part, as a hub to facilitate communication between various hardware, firmware, and software applications operating at information handling system 500, and the intelligent face framing management system 570. As another example of this, the multimedia processing control API 576 may receive software performance metrics generated at a diagnostic analysis application 505, describing applications available or running, number of videoconference participants, CPU usage or load, as well as a breakdown of the CPU usage attributable to each of a plurality of applications (e.g., including a MMCA 550) running via the operating system of the information handling system 500. The multimedia processing control API 576 may forward these software performance metrics to the neural network of the intelligent face framing management system 570 in an embodiment.

In yet another example of the multimedia processing control API 576 facilitating communication with the intelligent face framing management system 570 the multimedia processing control API 576 may receive sensor readings taken from one or more sensors of the information handling system 500 (e.g., a hall effect sensor or hinge rotation sensor, light sensors, color sensors, IR cameras, accelerometer, gyroscope, orientation sensor, or geographic position sensors), via the sensor drivers 531, as described in greater detail with respect to FIG. 2. In still another example of the multimedia processing control API 576 facilitating communication with the intelligent face framing management system 570 the multimedia processing control API 576 may receive default media capture instructions, default AV processing instruction module settings, or captured audio samples from a streaming media driver 525, as described in greater detail with respect to FIG. 2. For example, audio samples may be used in some embodiments in order to determine the frequency with which the user of the information handling system 200 is talking during a user session of the MMCA and which may be used to trigger the intelligent face framing management system to center and normalize a user's image only when the user is speaking in an example embodiment. In other embodiments, the multimedia processing control API 576 may receive default media capture instructions or default AV processing instruction module settings via direct communication with the multimedia framework pipeline and infrastructure platform 540.

The intelligent face framing management system 570 in an embodiment may also communicate directly with the MMCA 550 or indirectly via the multimedia processing control API 576 to gather meeting metrics describing user participation and performance of the MMCA 550 during a user session in which the information handling system 500 participates. The intelligent face framing management system 570 may receive one or more meeting metrics describing performance of the MMCA during execution of such a training user session in an embodiment. In some embodiments, these metrics may be gathered during routine out-of-band communications between the information handling system performance optimizer application 575 and the information handling system 500. Such meeting metrics may include, for example, a measure of the CPU resources consumed by the MMCA 550, including at times intelligent face framing management system image alterations are conducted, if any. Other example meeting metrics may include a measure of memory resources consumed. Still other example meeting metrics may compare CPU or memory usage by the MMCA 550 to total CPU or memory used by all applications, hardware, or firmware during the training user session.

Such meeting metrics may also describe the performance of media sample processing, transmission, and playback among a plurality of information handling systems (e.g., including 500) engaged in a single user session for the MMCA 550. For example, meeting metrics gathered by the intelligent face framing management system 570 during a training session may describe latency, or a measurement of time elapsing between a first information handling system (e.g., 500) transmitting the processed, encoded media sample and a second information handling system receiving the processed, encoded media sample. Meeting metrics may also include allocation of processing resources consumed during application of any AV processing modules used to execute optimized face framing adjustments generated from a trained intelligent face framing management system neural network to apply elected alterations to a user's image. As another example, meeting metrics may include a measurement of jitter, or a comparison between latency of playback for a media sample from one of the meeting participants, and latency of playback for another media sample from another of the meeting participants. Such jitter may cause the two separate media samples, which may have been recorded simultaneously, to playback such that they are out-of-sync with one another. Still other meeting metrics in an embodiment may measure bandwidth consumed by the MMCA 550, type of network used to transmit and receive media samples, packet loss (e.g., of video or audio samples), resolution and frames per second of video samples (both at the transmitting side and the receiving side), audio bitrate (both at the transmitting side and the receiving side), and one or more codecs or compression algorithms in use. In some embodiments, jitter, packet loss, latency, resolution, and frames per second may be measured separately for one or more of audio samples, video samples, and screen sharing samples.

The multimedia processing control API 576 may forward received videoframes including images of a user captured from a plurality of cameras, a user's selections of the features of the intelligent face framing system to enable, and user-specified preferred or desired settings (if any), sensor data for gauging the distance between the user and a camera capturing videoframes including images of the user, and default A/V processing instructions to the intelligent face framing management system 570 for determination of optimized face framing adjustments using the trained neural network or various A/V processing instruction modules described in embodiments herein. The neural network operating at the intelligent face framing management system 570, may operate remotely from the information handling system 500, to coordinate with various A/V processing instruction modules local to the information handling system 500 to determine user image features (e.g., nose, face, gaze, or head position) and optimized face framing adjustments. In other embodiments, the intelligent face framing management system 570 may operate locally in whole or in part at an agent 571 thereof, operating at the information handling system 500 that is conducting a videoconference session.

Figure 8:
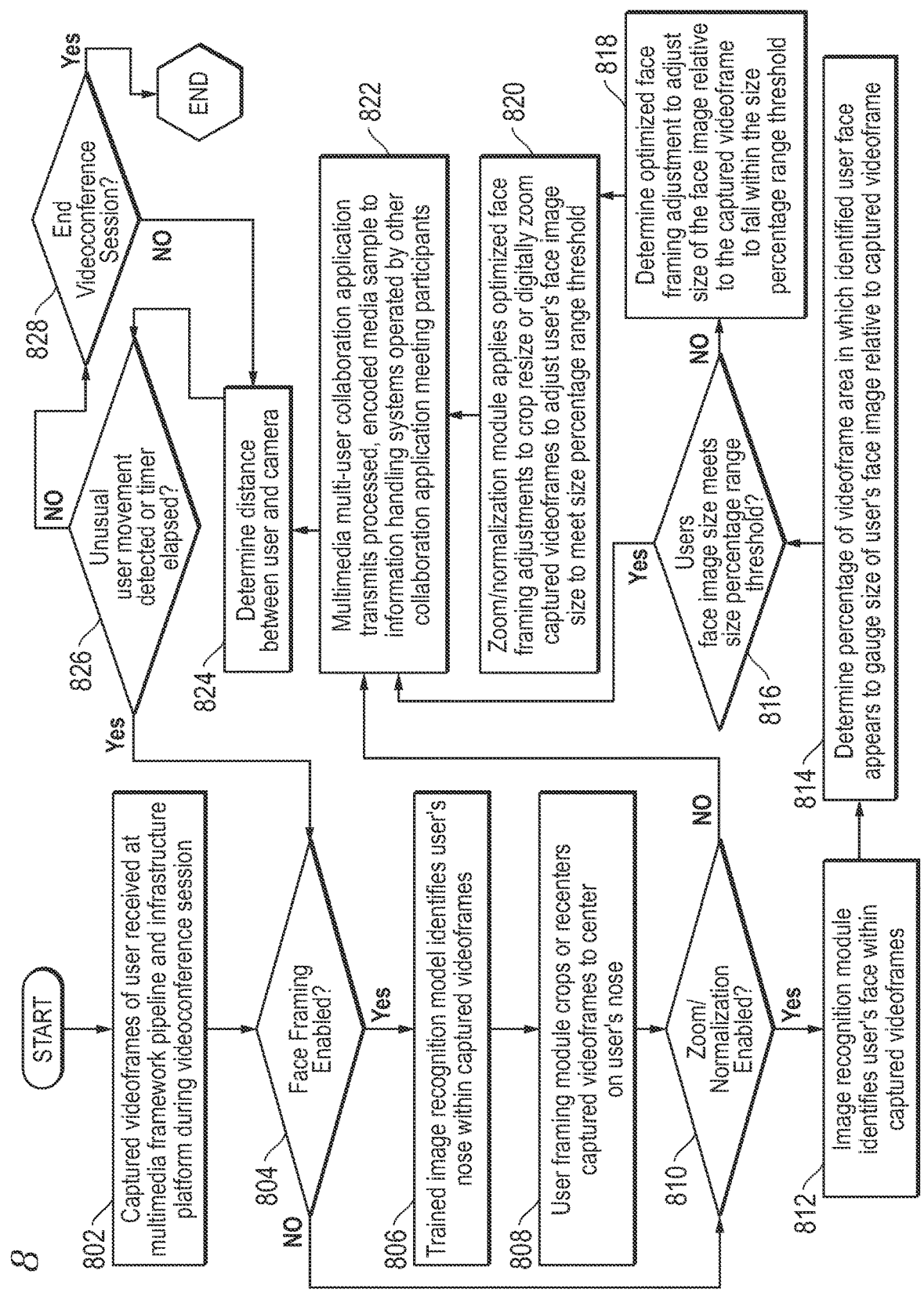
FIG. 8 is a flow diagram illustrating a method of centering and distance-normalizing a user's face within a captured videoframe according to an embodiment of the present disclosure.

As described in greater detail with respect to FIG. 8, the intelligent face framing management system 570 in an embodiment may direct various A/V processing instruction modules to determine optimized face framing adjustments to intelligently crop, resize, or zoom videoframes including images of a user, as captured by a selected gaze-centered camera or default camera, to center the user and normalize the size of the user's face so as to appear at a consistent distance as selected by a user or a default determination that may most effectively communicate the user's facial expressions during user sessions for an MMCA. Optimized face framing adjustments may include optimized normalizing face framing adjustments and optimized centering face framing adjustments among others in various embodiments. Each of the optimized face framing adjustments may be transmitted to the multimedia processing control API 576 in an embodiment. In some embodiments, a neural network may be used as part of the intelligent face framing management system 570 to receive the inputs described and output optimized face framing adjustments.

The multimedia processing control API 576 in an embodiment may transmit each of the optimized face framing adjustments received from the intelligent face framing management system 570 neural network to the application, controller, or driver at which such settings or instructions will be implemented. For example, the multimedia processing control API 576 may transmit optimized face framing adjustments identifying a gaze-centered camera to the streaming media driver 525. As described in greater detail with respect to FIG. 2, the streaming media driver 525 in an embodiment may direct the operation of the camera and the microphone such that media (e.g., images, video samples, audio samples) is captured according to the optimized media capture instructions. For example, the streaming media driver 525 in an embodiment may direct the camera identified as the gaze-centered camera within the optimized face framing adjustment to capture images and generate videoframes including images of the user. As another example, the streaming media driver 525 in an embodiment may direct the microphone to capture and generate audio samples having the bitrate defined by the optimized audio capture instructions. In still another example, the streaming media driver 525 in an embodiment may direct the digital display to display graphical user interfaces for a plurality of applications such as to generate a user interface to provide for feature settings within the intelligent face framing management system in some embodiments. Such feature settings in an embodiment may include selection of the centering feature, or the zoom and normalizing feature, a desired normalization face image size or range, other settings for centering or normalizing, or various triggers for enablement of the gaze-center camera selection feature.

In other embodiments, the multimedia processing control API 576 may transmit various optimized face framing adjustments to the streaming media driver 525 or to the multimedia framework pipeline and infrastructure platform 540. For example, the multimedia processing control API 576 may transmit optimized face framing adjustments identifying the gaze-centered camera to the streaming media driver 525 or to the multimedia framework pipeline and infrastructure platform 540. As described herein, streaming media driver 525 may direct peripherally connected cameras or microphones to capture video and audio. The streaming media driver 525 in an embodiment may do so pursuant to instructions received from the multimedia framework pipeline and infrastructure platform 540. Thus, instructions for performing such capture of media samples (e.g., video or audio samples) in an embodiment may be stored at or executed by one or more of the multimedia framework pipeline and infrastructure platform 540 or the streaming media driver 525.

In another aspect of an embodiment, the multimedia processing control API 576 may transmit various optimized face framing adjustments for cropping, centering, resizing, or digitally zooming an image of the user within a captured videoframe to the multimedia framework pipeline and infrastructure platform 540. For example, the multimedia processing control API 576 in an embodiment may transmit optimized face framing adjustments to the multimedia framework pipeline and infrastructure platform. As described herein, the multimedia framework pipeline and infrastructure platform may perform post-capture processing of media samples (e.g., video samples and audio samples) such as to alter a user image in videoframes pursuant to a received optimized face framing adjustments. The multimedia framework pipeline and infrastructure platform 540 in an embodiment may include an AV processing instruction manager 541 directing the video processing engine 580 or audio processing engine 590 to perform various post-capture media processing methods (also referred to herein as AV processing instruction modules) on captured videoframes (or on externally received media samples during a user session with the MICA 550). Optimized AV processing instruction adjustments in an embodiment may direct the AV processing instruction manager 541 to include or exclude one or more specifically identified AV processing instruction modules in an embodiment to conduct, for example, cropping, centering, digitally zooming, or resizing a user's image within a videoframe pursuant to optimized face framing adjustments generated by the trained neural network of the intelligent face framing management system 570.

FIG. 6

Figure 6:
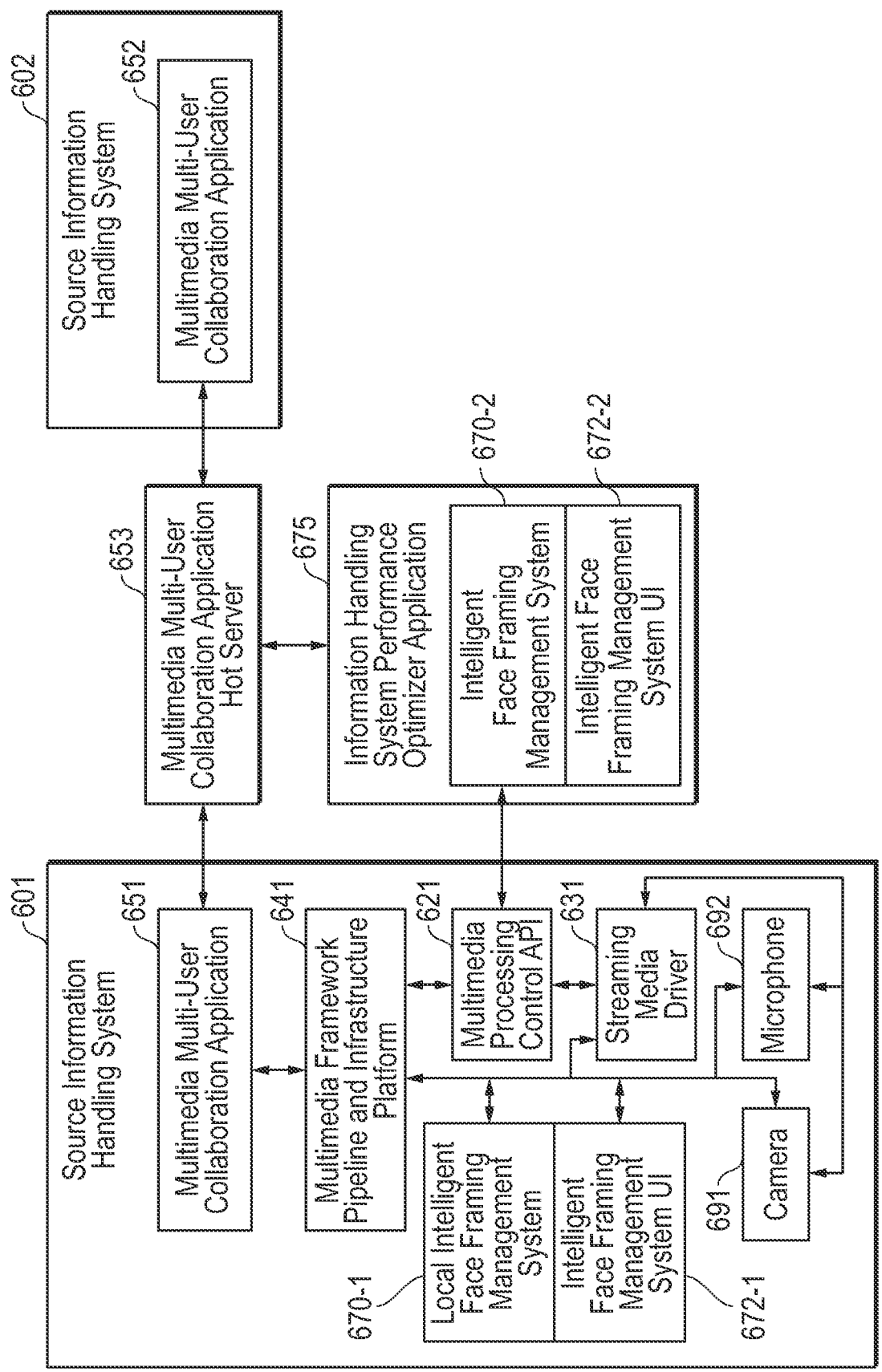
FIG. 6 is a block diagram illustrating a second embodiment of an intelligent face framing management system for optimizing information handling system usage of a multimedia, multi-user collaboration application according to an embodiment of the present disclosure.

FIG. 6 is a block diagram illustrating another embodiment of an intelligent face framing management system for coordinating processing of media samples across a plurality of information handling systems that are each participating in the same user session of a MMCA according to an embodiment of the present disclosure. User sessions may be hosted and coordinated by a MMCA host server 653 located remotely from, but in communication with one or more source information handling systems (e.g., 601) and one or more sink information handling systems (e.g., 602) via a network.

As described herein, the intelligent face framing management system 670-1 or 670-2 may generate optimized face framing adjustments which may include optimizing various settings for peripheral devices used in the capture at a source information handling system 601 of media samples that are to be played across a plurality of sink information handling systems (e.g., including 602) during user sessions for a MMCA (e.g., 651 or 652). The MMCA host server 653 in an embodiment may comprise a plurality of servers executing software for facilitating the exchange of videoframes including images of users of a plurality of information handling systems (e.g., 601 and 602) participating in the same videoconference session.

As described herein, for example in an embodiment described with reference to FIG. 5, the intelligent face framing management system 670-1 or 670-2 may transmit optimized face framing adjustments to the multimedia processing control API (e.g., 621 in 670-1), based on outputs from the trained neural network of the intelligent face framing management system. In an embodiment shown in FIG. 6, in which the intelligent face framing management system 670-2 operates within the information handling system performance optimizer application 675, remotely from either the source information handling system 601 or the sink information handling system 602, the intelligent face framing management system 670-2 may determine such use image features (e.g., nose, face, gaze, or head position) or even optimized face framing adjustments for the source information handling system 601 and transmit the optimized face framing adjustments output by this first neural network to the multimedia processing control API 621. For example, the multimedia processing control API 621 may direct the optimized face framing adjustments to AV processing instruction modules within the multimedia framework pipeline and infrastructure platform 641, such as those modules described herein to conduct alteration to a user image in captured videoframe data according to various embodiments. The intelligent face framing management system 670-2 may operate remotely from information handling system 601, or may operate locally 670-1, in whole or in part.

The information handling system performance optimizer application 675 in an embodiment may also include an intelligent face framing management system user interface (UI) 672-2 allowing a user to enable or disable various features of the intelligent face framing management system 670-2. In some embodiments, the intelligent face framing management system UI 672-2 may operate remotely from the information handling system 601 engaged in the videoconference. In other embodiments, an intelligent face framing management system UI 672-1 may operate locally on the information handling system 601. For example, the intelligent face framing management system UI (e.g., 672-1 or 672-2) may provide a graphical user interface or other user interface accessible by the user of the information handling system 601, allowing the user to enable or disable the selection of a gaze-centered camera, the face normalization and zooming feature, or the face centering feature of the intelligent face framing management system 601 (e.g., as described in greater detail with respect to FIGS. 7 and 8). The intelligent face framing management system UI (e.g., 672-1 or 672-2) in some embodiments may allow the user to set the intelligent face framing management system to only engage these features upon certain trigger conditions, such as detection of the user speaking during a videoconference.

The user may also provide various settings via the intelligent face framing management system UI (e.g., 672-1 or 672-2). For example, the user may provide normalization settings in which the user selects a desired face size with respect to the size of the videoframe. The user may also provide a percentage threshold range which may define the degree to which the size of the user's face image may vary from the desired size described directly above, in order to trigger the intelligent face framing management system to automatically resize or digitally zooms the user's face image. The user may also provide sensitivity settings for the centering feature and the gaze-centered camera selection feature. For example, the user may define a preferred or desired degree to which the user may avert her gaze away from a camera to trigger the gaze-centered camera selection feature to select a new camera for capturing videoframes of the user during the videoconference. As another example, the user may define a preferred or desired distance the user's nose may be located from the center of the videoframe to trigger the intelligent face framing management system to recenter the user's image within the videoframe.

Optimized face framing adjustments transmitted to the multimedia processing control API 621 of the source information handling system 601 in an embodiment may include, for example, optimized face framing adjustments with media capture adjustments identifying a gaze-centered camera, as described in embodiments herein. The multimedia processing control API 621 in such an embodiment may transmit these optimized adjustments to the streaming media driver 631. The streaming media driver 631 in such an embodiment may direct the camera 691 identified within the optimized face framing adjustments to capture videoframes including images of the user during the videoconference session. In some embodiments, the optimized face framing adjustments identifying the gaze-centered camera may be transmitted from the multimedia processing control API 621 to the multimedia framework pipeline and infrastructure platform 641 instead.

Optimized face framing adjustments output by a trained neural network trained for source information handling system 601 and transmitted to the multimedia processing control API 621 in an embodiment may also include, for example, optimized face framing adjustments for cropping, centering, resizing, or zooming an image of a user within a captured videoframe, according to various embodiments herein. The optimized face framing adjustments may be optimized normalizing face framing adjustments, optimized centering face framing adjustments, or some combination in various embodiments. The intelligent face framing management system 670 in an embodiment may transmit one or more of these optimized face framing adjustments to the multimedia framework pipeline and infrastructure platform 641.

As described in greater detail with reference to FIGS. 3-4, the AV processing instruction manager of the multimedia framework pipeline and infrastructure platform 641 in an embodiment may execute one or more AV processing instruction modules on video samples received from the camera 691 via the streaming media driver 631, and audio samples received from the microphone 692 via the streaming media driver 631. The AV processing instruction modules executed by the multimedia framework pipeline and infrastructure platform 641 in such an embodiment may be selected or enabled based on the optimized face framing adjustments. For example, the intelligent face framing management system in an embodiment may enable a user framing module based on received user input enabling this feature, and upon a determination that a test videoframe capturing an image of the user requires recentering of the user's image within the videoframe, as described in greater detail with respect to FIG. 8. As another example, the intelligent face framing management system in an embodiment may enable a zoom and face normalizer module based on received user input enabling this feature, and upon a determination that the size of the user's face with respect to the size of the videoframe does not fall within a preset size percentage range threshold, as also described in greater detail with respect to FIG. 8.

The multimedia framework pipeline and infrastructure platform at an information handling system (e.g., 602) operating as a media sink in an embodiment may retrieve the remotely captured, media sample that was processed and encoded at a source information handling system (e.g., 601). The remotely captured media sample may include audio and video captured at the source information handling system 601 from the MMCA 652. In such an embodiment, the multimedia framework pipeline and infrastructure platform at information handling system 602 may perform one or more AV processing instruction modules on the processed and encoded media sample, including demultiplexing and decoding of the media sample into formats compatible with a display and speakers of the sink information handling system 602 according to embodiments herein. For example, a multiplexing module of the multimedia framework pipeline and infrastructure platform may demultiplex or split the processed and encoded media sample captured at the source information handling system 601 into an encoded video sample and an encoded audio sample. As another example, a video compression module of the multimedia framework pipeline and infrastructure platform of sink information handling system 602 may decode or decompress the demultiplexed video sample into a format that may be transmitted via a streaming media driver to a digital display for playback. As yet another example, an audio compression module of the multimedia framework pipeline and infrastructure platform may decode or decompress the demultiplexed audio sample into a format that may be transmitted via the streaming media driver to a peripherally attached speaker for playback according to embodiments of the present disclosure.

Figure 7:
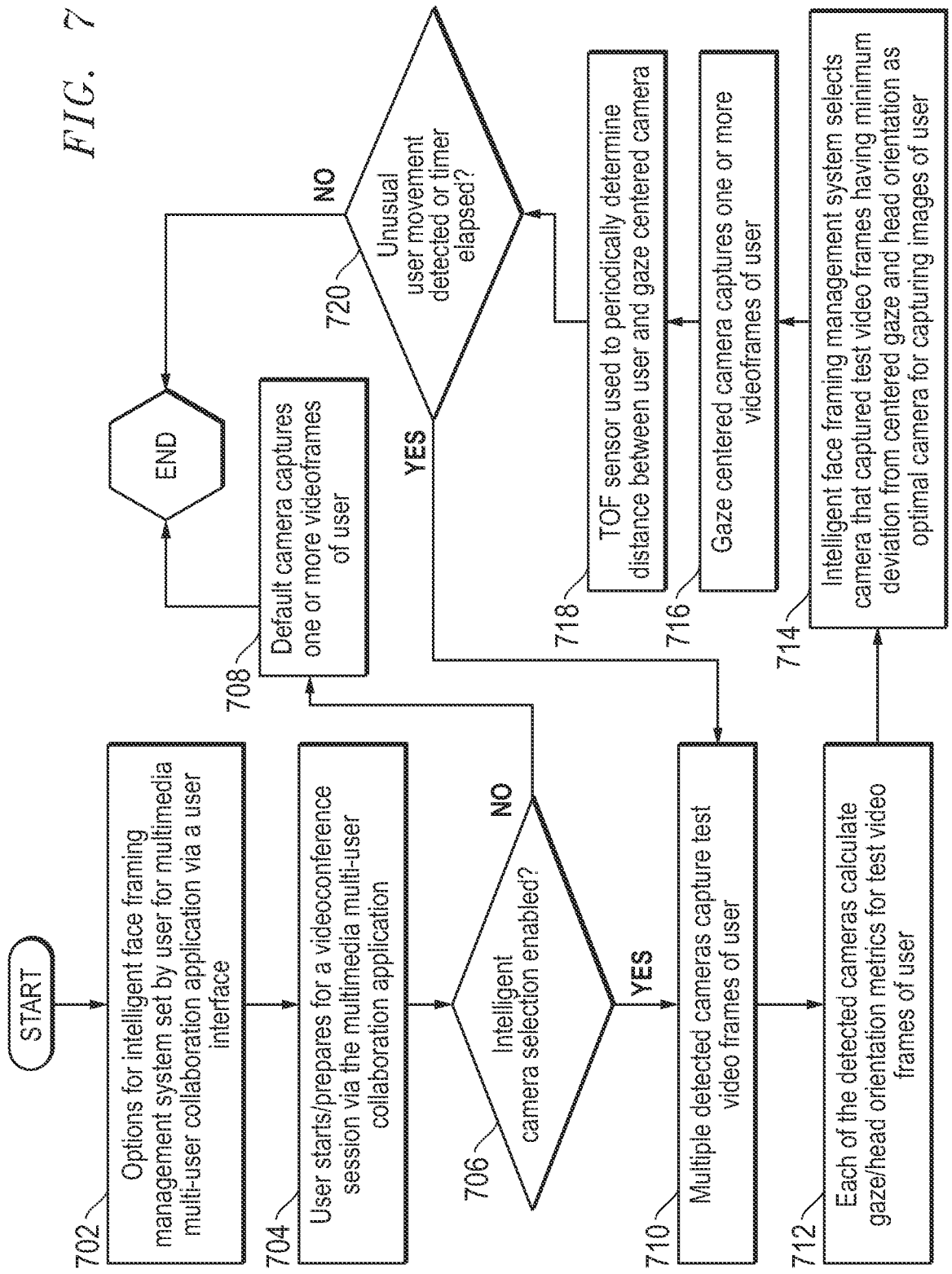
FIG. 7 is a flow diagram illustrating a method of identifying a gaze-centered camera for capturing front-facing images of a user according to an embodiment of the present disclosure.

FIG. 7 is a flow diagram illustrating a method of identifying a gaze-centered camera from a plurality of cameras oriented at different angles with respect to a user of an information handling system, for capturing videoframes including front-facing images of a user according to an embodiment of the present disclosure. As described herein, most existing MMCAs employ a specifically identified default camera (e.g., the camera mounted to or incorporated within the display on which the MMCA GUI is displayed) for capturing videoframes including images of the user during videoconference sessions. For example, a user may have a camera on a docked laptop information handling system and another webcam camera mounted on a desktop display. If the user averts their gaze toward another display and away from the camera capturing videoframes including their images, the camera may only capture a portion or side-view of the user, rather than a portrait, front-facing view of the user which may be desirable for efficient communication among participants. The intelligent face framing management system in an embodiment may avoid these issues by using a trained machine-learning neural network to identify a gaze-centered camera toward which the user is currently facing for capturing videoframes including images of the user during a videoconference session.

At block 702, the intelligent face framing management system in an embodiment may obtain control setting options indicating a selection by a user to utilize one or more services or features of the intelligent face framing management system. Such services may be provided, in whole or in part, remotely via an information handling system optimizer application and system or may be available, in any portion, at the user's information handling system as described herein. In an embodiment, the information handling system optimizer application or the local information handling system may generate a user interface for the intelligent face framing management system presented to the user with selections for activating these various services or features. For example, the intelligent face framing management system user interface may offer selection by a user to enable or disable features or services such as intelligent camera selection, intelligent face framing, or intelligent zooming and distance normalization.

A plurality of information handling systems may join a user videoconference session within the MMCA in an embodiment at block 704. One or more of the participant information handling systems may have intelligent face framing management systems. For example, in an embodiment described with reference to FIG. 6, a source information handling system 601 and a sink information handling system 602 may both join a videoconference user session via the MMCA host server 653. The user videoconference session joined at block 704 may be joined by any number of information handling systems. The MMCA may manage authenticating one or more invited participants, establishing communication and data links between participants, enabling features of the videoconference such as document sharing, recording, and similar operations of the MMCA.

At block 706, the intelligent face framing management system in an embodiment may determine whether the intelligent camera selection feature has been enabled. As described with reference to block 702 above, the user may choose to enable or disable this feature via a user interface for the MMCA, or other application, for example. If the intelligent camera selection feature has not been enabled, the method may proceed to block 708 to capture videoframes including images of the user from a default or currently selected camera. If the intelligent camera selection feature has been enabled, the method may proceed to block 710 to determine a gaze-centered camera based on videoframes captured from a plurality of cameras oriented at different angles with respect to the user.

In an embodiment in which the intelligent camera selection feature has not been enabled via a user interface, a default or currently selected camera may capture one or more videoframes including images of the user at block 708. As described herein, the multimedia framework pipeline and infrastructure platform and streaming media driver may direct one or more cameras operably connected to the information handling system to capture videoframes including images of the user. The multimedia framework pipeline and infrastructure platform or streaming media driver in an embodiment may identify a default camera (e.g., a camera having a highest resolution, or camera mounted to or incorporated within the peripheral display at which the MMCA GUI is displayed) for capturing videoframes including images of the user during the videoconference session. In other embodiments, the user may select such a default camera within a GUI for the MMCA. In an embodiment in which the intelligent camera selection feature is disabled, but one or more of the face framing or zooming and normalization features are enabled, the face framing or zoom/normalizing A/V processing instruction modules may be applied to the videoframes including images of the user captured by the default camera at block 708, as described in greater detail with respect to FIG. 8.

At block 710, in an embodiment in which the intelligent camera selection feature has been enabled, each of a plurality of cameras operably connected to the information handling system may capture test video frames of the user. These test video frames may be analyzed within firmware for each of the peripheral cameras to measure the user's gaze vector and head orientation vector (e.g., angled to the left or right of center), indicating the degree to which the user is averting her gaze away from the camera. Based on these captured test videoframes, the intelligent face framing management system in an embodiment may identify a camera into which the user is most-closely gazing for capturing of further videoframes including images of the user during the videoconference. This may ensure that the captured videoframes including images of the user in a videoconference show a relatively front-facing view of the user.

Each of the peripheral cameras capturing test video frames of the user in an embodiment may determine gaze/head orientation metrics for the test video frames of the user at block 712. The gaze/head orientation metrics may be determined by the peripheral cameras in an embodiment using any known method in the art. For example, one method may include use of an image recognition system to identify the user's eyes and mouth within the captured test videoframes, and to calculate the degree to which the user's head is rotated away from center based on the distances between the corners of the user's eyes and mouth. In other approaches, different anchor points and the distances between them may be analyzed, such as the centers of the eyes, or the center of the nose. Still other approaches include detection of a portion or whole user's ear. Using any of these distance measurements, the firmware for the peripheral cameras may determine gaze and head orientation vectors of a user's image indicating a degree to which the user's head is looking away from the camera capturing that test videoframe of the user. These gaze and head orientation vectors may be transmitted to the intelligent face framing management system in an embodiment via the streaming media driver, and the multimedia processing control API, for example.

At block 714, the intelligent face framing management system in an embodiment may select the camera that captured test video frames having a least measured degree to which the user's head is looking away from that camera as the gaze-centered camera. For example, if the user's gaze is oriented at 20% to the right of a first camera, and oriented at 5% to the left of a second camera in an embodiment, the intelligent face framing management system may identify the second camera as the gaze-centered camera. This second camera may then be selected for capturing of further videoframes including images of the user during the videoconference session, because the second camera is most likely to capture videoframes including front-facing images of the user, while the first camera is more likely to capture more of the right side of the user's face than the left side of the user's face. The intelligent face framing management system in an embodiment may output optimized face framing adjustments to select a gaze-centered video camera that has the minimum measured deviation from the central gaze of the user in the captured test videoframes.

The gaze-centered camera may capture one or more videoframes including images of the user in an embodiment at block 716. The intelligent face framing management system may, for example in an embodiment described with respect to FIG. 5, transmit the optimized face framing adjustment identifying the gaze-centered video camera to the streaming media driver 525 via the multimedia processing control API 576. The streaming media driver 525 may transmit any media capture instructions received from the multimedia framework pipeline and infrastructure platform 540 pursuant to execution of the MMCA 550 during a videoconference session to the gaze-centered video camera identified within the optimized face framing adjustment. The gaze-centered video camera may then capture videoframes including front-facing images of the user during the videoconference session, and transmit those videoframes back to the multimedia framework pipeline and infrastructure platform 540 via the streaming media driver 525 for further processing via a plurality of A/V processing instruction modules. For example, in an embodiment in which one or more of the face framing or zooming and normalization features are enabled, the face framing or zoom/normalizing A/V processing instruction modules may be applied to the videoframes including images of the user captured by the gaze-centered video camera at block 716, as described in greater detail with respect to FIG. 8.

The intelligent face framing management system in an embodiment may determine a distance between the user and the gaze-centered camera capturing the image of the user, based on data gathered by a time of flight (TOF) sensor at block 718. According to embodiments herein, a proximity sensor (or other camera) detection may detect distance data between a camera system (e.g., the gaze-centered camera) and a user before the camera system in an embodiment. In an embodiment, a TOF sensor may be used. Any TOF sensor may be used and may include laser, visual spectrum, near infrared (IR), or IR spectrum camera TOF sensors to determine distance data of a user, an object, or other background elements based on time for light from a light source in a known location to bounce off of a person or object and be sensed by a camera sensor such as a charge coupled device (CCD). For example, in an embodiment described with reference to FIG. 2, the TOF sensor 248 may have a light source and charge coupled device (CCD) or other camera sensor located in a known position relative to the camera system used to capture videoframes according to an example embodiment. Determination of distances in a space in front of the camera system may be conducted via scanning such as with a light detection and ranging (LIDAR) system in one example embodiment. This TOF sensor data may be used to determine when a user has moved with respect to the gaze-centered camera, potentially requiring a new camera to be identified as the gaze-centered camera.

At block 720, the intelligent face framing management system in an embodiment may determine whether unusual user movement has been detected, or whether a preset timer has elapsed since the gaze centered video camera was identified at block 714. As described herein, if the user's position shifts to interface more easily with a peripheral device upon which the camera currently capturing the user's image is not mounted, the user's may also alter her gaze toward this other peripheral display device. This may prompt a need to repeat the process of identifying the camera into which the user is most directly facing. Similarly, in some embodiments, this process may be repeated periodically, after a preset time following determination of the gaze-centered camera has elapsed.

In an embodiment described with reference to FIG. 3, for example, the TOF distance data gathered at block 720 may be input into a videoframe unusual motion detection (UMD) software module 382 which may correlate the scanned distance data with locations within a videoframe, and determine from that information the location and distance of a user appearing in the videoframe. The UMD software module 382 in an embodiment may determine changes in distances across a plurality of sequential videoframes or movement within the images of the sequential videoframes to assess videoframe movement. For example, the UMD software module 382 may compare TOF measurements of the distance between the user and the gaze-centered camera, as measured at two different points in time. If these measurements differ by a preset threshold value (e.g., 10%, 20%, 50%, etc.), the UMD software module 382 in an embodiment may determine the user's position with respect to the gaze-centered camera has shifted enough to warrant repeating the process of identifying the camera most likely to capture a front-facing view of the user. If unusual user movement is not detected and a preset timer has not elapsed, the method for identifying a gaze centered video camera for capturing videoframes including images of the user during a videoconference session may end. If unusual movement is detected, or the preset timer has elapsed, the method may proceed back to block 710 to repeat the process of identifying a gaze centered video camera for capturing of videoframes including images of the user during the remainder of the videoconference session. By repeating the loop between blocks 710 and 720, the intelligent face framing management system may continuously ensure the camera into which the user is most directly facing is always capturing the videoframes including images of the user that will be displayed to other participants of the videoconference session. The method may then end.

FIG. 8

FIG. 8 is a flow diagram illustrating a method of centering a user's face and normalizing a distance at which the user appears from the camera within captured videoframes for a videoconference session according to an embodiment of the present disclosure. As described herein, the intelligent face framing management system in an embodiment may use a trained image detection model to identify the user's face and nose within a captured videoframe and zoom in or out on the user's face within a captured and centered videoframe in order to normalize the perceived distance between the camera and the user within the captured videoframes. The intelligent monitoring management system in embodiments may then output one or more face framing adjustments to crop or resize the captured videoframe in order to place the user's face and nose within the center of the captured videoframe and to increase or decrease the size of the user's face within the centered videoframe. In such a way, the intelligent face framing management system may remedy distractions caused by the user appearing to other participants to be off-center, to be too small or too large within the captured videoframes including images of that user, and may preserve other participants' visibility of the user's facial expressions required for comprehension of social cues.

At block 802, videoframes including images of a user captured by a camera may be received at the multimedia framework pipeline and infrastructure platform during a videoconference session. The videoframes may be captured in an embodiment by a default or most-recently selected camera (e.g., as described with reference to FIG. 7 at block 710). In another embodiment, the videoframes may be captured by a gaze-centered camera identified at block 714 by the intelligent face framing management system as the most likely of a plurality of available cameras to capture videoframes including front-facing images of the user. In still other embodiments, the camera capturing the videoframes received at block 802 may change during a single videoconference session. For example, if the UMD module detects a change in the user's position with respect to a first camera capturing videoframes including images of the user during the videoconference, the intelligent face framing module may direct a second camera determined to be more likely to capture videoframes including front facing images of the user following the user's change in position to begin capturing videoframes including images of the user.

The intelligent face framing management system in an embodiment may determine at block 804 whether the face framing feature has been enabled. As described above with reference to FIG. 7 at block 702, the user may choose to enable or disable this feature via a user interface for the MMCA, or other application, for example. If the face framing feature has not been enabled, the method may proceed to block 810 to determine whether the zoom/normalization feature has been enabled. If the face framing feature has been enabled, the method may proceed to block 806 to identify the user's nose within the captured videoframes and center the videoframes on the user's nose.

At block 806, in an embodiment in which the face framing feature has been enabled, the trained image recognition module may identify the user's nose within the captured videoframes. For example, in an embodiment described with reference to FIG. 3, the A/V processing instruction manager 341 may receive the captured videoframes including images of the user via the streaming media driver 325 and direct execution of the image recognition module 384. The image recognition module may include code instructions for recognizing various types of objects within a captured videoframe. In various embodiments, the image recognition module may include code instructions of an image recognition application programming interface (API) capable of identifying the user's nose within the captured videoframes. Any image recognition API known in the art is contemplated for use with the image recognition module. Specifically contemplated APIs may include Microsoft computer vision API®, Microsoft Video API®, Azure Face API®, or Google Cloud Vision API®. In other embodiments, the image recognition module may direct or trigger execution of other image recognition software to detect the user's nose, including, for example, Google Deepdream®, Amazon Rekognition®, Azure Custom Vision Service®, or IBM Watson Visual Recognition®.

The user framing module in an embodiment may crop or recenter the captured videoframes to center on the user's nose at block 808. Upon identification of the user's nose in the captured videoframe at block 806, the user framing module may crop the captured videoframes in an embodiment in order to place the user's nose in the center of the videoframe. For example, if the user's nose is located to the right of center in the videoframe, the user framing module may crop a portion of the left side of the captured videoframe such that the user's nose appears in the center of the cropped videoframe. The user framing module in some embodiments may further crop a top or bottom portion of the videoframe, or both, in order to maintain a consistent size of the videoframe. This may impart the appearance of shifting the user's image to the right in the videoframe and resizing the image of the user within the videoframe. In such a way, the intelligent face framing management system may remedy distractions caused by the user appearing to other participants to be off-center. As will be described below, this centering may be conducted iteratively with detected motion to keep a user's image centered in the videoframe.

At block 810, in an embodiment in which the face framing feature has not been enabled, or, alternatively, in which the face framing module has cropped the captured videoframes to center on the user's nose, the intelligent face framing management system in an embodiment may determine whether the zoom/normalization feature has been enabled. As described above with reference to FIG. 7 at block 702, the user may choose to enable or disable this feature via a user interface for the MMCA, or other application, for example. If the zoom/normalization feature has not been enabled, the method may proceed to block 822 to execute other A/V processing instruction modules. If the zoom/normalization feature has been enabled, the method may proceed to block 812 to identify the user's face within the captured videoframes and normalize the size of the user's face within the videoframe.

The image recognition module in an embodiment may identify the user's face within the captured videoframes at block 812. Such an identification may identify a plurality of pixels within the videoframe depicting a portion of the image of the user's face. Once the user's face has been identified, the intelligent face framing management system may determine, based on the size of the user's face within the captured videoframe, whether the user is leaning in toward the camera (e.g., resulting in the user's face taking up a larger portion of the videoframe) or leaning back and away from the camera (e.g., resulting in the user's face taking up a smaller portion of the videoframe). This distinction may be assisted by sensor proximity data of a sensor system such as a TOF sensor in an embodiment. These postures, or movement between these postures during a videoconference may distract other participants viewing the videoframes capturing the images of the user's face. Further, videoframes capturing the user's face when the user is located very close or very far away from the camera may be undesirable or may not effectively impart the facial expressions other participants may need in order to pick up on social cues and effectively understand the user's communications during the videoconference session.

At block 814, the intelligent face framing management system may determine a percentage of the videoframe area in which the identified user face appears in order to gauge the size of the user's face image relative to the captured videoframe. For example, the intelligent face framing management system in an embodiment may compare the number of pixels identified at block 812 as depicting a portion of the image of the user's face to a total number of pixels rendered within the videoframe. Other techniques are contemplated as well. Such a determination of relative distances of sides or top of an identified image of the user's head relative to a total width or height of the videoframe.

The intelligent face framing management system may determine at block 816 in an embodiment whether the user's face image size meets a size percentage range threshold or other sizing threshold. This size percentage range threshold may be preset in an embodiment to a range of values that ensure the image of the user is sized to appear in a middle range from the camera in the videoframe. In other words, any percentage of the image of the user's face in the videoframe may be selected via a GUI. The percentage may be a default value, for example, selected as a user's image is sufficiently clear to impart facial expressions necessary for effective communication. For example, the size percentage range threshold may be preset to a value or a range such as 15% to 20%. In such an embodiment, the intelligent face framing management system may determine whether the number of pixels depicting the identified image of the user's face is greater than 20%, or lesser than 15% of all pixels rendered within the videoframe in an example intended to avoid resizing too frequently.

As the values within this preset range increase, the tolerance of the intelligent face framing management system for users to lean in toward the camera may consequently increase. In contrast, as the values within this range decrease, the tolerance of the intelligent face framing management system for users to lean back and away from the camera may consequently increase. The range of values given within the preset size percentage range threshold may control the degree to which the user's facial image may increase or decrease in size away from a median value before the intelligent face framing management system resizes the videoframe including the user's facial image. If the intelligent face framing management system determines the user's face image size does not meet the size percentage threshold, such as a range, zooming or normalizing the size of the user's image within the videoframe may be necessary, and the method may proceed to block 818. If the intelligent face framing management system determines the user's face image size meets the size percentage range threshold, then zooming or normalizing the size of the user's image within the videoframe may be unnecessary. At that point, the method may proceed to block 822 to execute other A/V processing instruction modules.

At block 818, in an embodiment in which the size of the image of the user's face does not meet the size percentage range threshold or other size threshold, the intelligent face framing management system may determine an optimized face framing adjustment to adjust the size of the face image relative to the captured videoframe to fall within the size percentage range threshold or other size threshold. For example, if the ratio of the number of pixels depicting the image of the user's face to the number of pixels rendered in the whole videoframe falls below the size percentage range threshold, the intelligent face framing management system in an embodiment may digitally zoom in on the user's facial image by resizing the user's facial image within the videoframe. This may be achieved by performing any digital zooming algorithms known in the art. For example, the intelligent face framing management system in an embodiment may perform various algorithms to increase the number of pixels dedicated to displaying the image of the user. The pixels within a videoframe may be sorted into columns and rows, with each pixel having a column value, row value, and image value (e.g., brightness, grayscale value, RBG color value, or other color value). The number of pixels dedicated to displaying the image of the user may be increased by a factor of two, for example, by duplicating a value associated with one pixel identified as displaying the image of the user across that pixel and its nearest neighbor. The value for that nearest neighbor may then be shifted to its nearest neighbor and duplicated. This method may be repeated until all of the pixels within the videoframe have received adjusted values. In other embodiments, the values imparted to the nearest neighbors may be interpolated, predicted, or estimated, rather than duplicated. For example, such method may include a zero order hold algorithm, or K zoom factor algorithm. Other digital zoom algorithms may also be used in various embodiments. The resulting optimized face framing adjustment may thus crop out the area within the videoframe surrounding the user's facial image to expand the user's image until the user's facial image size in comparison to the total size of the videoframe falls within the size percentage range threshold.

As another example, if the ratio of the number of pixels depicting the image of the user's face to the number of pixels rendered in the whole videoframe exceeds the size percentage range threshold, the intelligent face framing management system in an embodiment may digitally zoom out on the user's facial image by resizing the user's facial image within the videoframe such that the number of pixels dedicated to the display of the user's facial image falls within the size percentage range threshold. The videoframe in an embodiment may include only a portion of the full field of view captured by the camera. In such an embodiment, image data assigning values to pixels not included within the videoframe may be stored at the information handling system. The process of zooming out on the user's facial image, and thus decreasing the size of the user's facial image with respect to the size of the videoframe in such an embodiment may begin by accessing the stored image data for the full field of view of the camera. For example, the videoframe may include image data for pixels within a grid including 1280 columns and 720 rows (e.g., a standard resolution), while the image capturing the full field of view of the camera may include image data for pixels within a grid including 1920 columns and 1080 rows (e.g., a high-definition resolution of 1080p). The intelligent face framing management module in an embodiment may determine the number of pixels within the image capturing the full field of view of the camera that must include the identified image of the user's face in order for the size of the user's facial image to fall within the size percentage range threshold described with reference to block 816. The intelligent face framing management module may then resize the number of pixels rendered within the videoframe to match this value. This may result in effectively zooming the videoframe out to capture portions of the camera's field of view previously cropped from the videoframe. Because the size of the videoframe is expanded in such a way, while the size of the user's facial image with respect to its surroundings does not change, the size of the user's facial image may decrease in comparison to the size of the videoframe.

The zoom/normalization module in an embodiment may apply the optimized face framing adjustment to crop or resize and digitally zoom the user's image in the captured videoframes to adjust the user's face image size to meet the size percentage range threshold at block 820. For example, the zoom/normalization module may crop the edges of the videoframe in an embodiment in which the optimized face framing adjustment operates to digitally zoom in on the user's facial image. As another example, the zoom/normalization module may resize the image originally captured in the videoframe using the stored image data including portions of the camera's field of view previously cropped from the originally captured videoframe to zoom out.

Upon execution of each of the A/V processing instruction modules and to adjust a user image to center or normalize it within the videoframe in an embodiment, the multimedia multi-user collaboration application may transmit to other information handling systems participating in the videoconference the resulting processed, encoded media sample including videoframes depicting centered and normalized images of the user at block 822. For example, in an embodiment described with reference to FIG. 6, the A/V processing instruction manager of the multimedia framework pipeline and infrastructure platform (e.g., 641) at the source information handling system (e.g., 601) may perform several A/V processing instruction modules on incoming audio and video samples, including encoding and multiplexing of these samples to form a processed, encoded media sample. This may also include execution of the user framing module, videoframe unusual motion detection module, zoom and face normalizer module, and image recognition module, as described herein. In such an embodiment, the processed, encoded media sample may be then be forwarded to the MMUC 651 for transmission (e.g., via a network) to the MMUC 652 at the sink information handling system 602.

The MMUC in an embodiment may transmit the processed, encoded media sample to one or more remotely located information handling systems also participating in the same user session of the MMUC. For example, in an embodiment described with reference to FIG. 4, the processed and encoded media sample may be transmitted or streamed to the MMUC 450, where it will be streamed to a URI in the network 407 via the network interface device 409. In such a way, the intelligent face framing management system in an embodiment may crop or resize videoframes including images of a user to center the user and normalize the size of the user's face so as to most effectively communicate the user's facial expressions within the videoconference user session.

The intelligent face framing management system in an embodiment may determine a distance between the user and the gaze-centered camera capturing the image of the user, based on data gathered by a time of flight (TOF) sensor at block 824. According to embodiments herein, a proximity sensor (or other camera) detection may detect distance data between a camera system (e.g., the gaze-centered camera) and a user before the camera system in an embodiment. In an embodiment, a TOF sensor may be used. The TOF sensor may also detect distances of a user as a threshold range. The method may proceed to block 826 where the TOF sensor data may be used to determine when a user has moved with respect to the gaze-centered camera, potentially requiring a zoom adjustment or a new camera to be identified as the gaze-centered camera.

At block 826, the intelligent face framing management system in an embodiment may determine whether unusual user movement has been detected, or whether a preset timer has elapsed since the gaze centered video camera was identified. As described herein, if the user's position with respect to the camera capturing the videoframes that include images of the user, the position of the user's facial image within the captured videoframe may also shift. This may prompt a need to repeat the process of recentering or zooming/normalizing the size of the user's facial image within the videoframe. Similarly, in some embodiments, this process may be repeated periodically, after a preset time following recentering or zooming/normalizing the size of the user's facial image.

In an embodiment described with reference to FIG. 3, for example, the TOF distance data gathered at block 824 may be input into a videoframe unusual motion detection (UMD) software module 382 which may correlate the scanned distance data with locations within a videoframe, and determine from that information the location and distance of a user appearing in the videoframe. The UMD software module 382 in an embodiment may determine changes in distances across a plurality of sequential videoframes or movement within the images of the sequential videoframes to assess videoframe movement. For example, the UMD software module 382 may compare TOF measurements of the distance between the user and the gaze-centered camera, as measured at two different points in time. If these measurements differ by a preset threshold value (e.g., 10%, 20%, 50%, etc.), the UMD software module 382 in an embodiment may determine the user's position with respect to the gaze-centered camera has shifted enough to warrant repeating the process of identifying the camera most likely to capture a front-facing view of the user. If unusual user movement is not detected and a preset timer has not elapsed, the method may proceed to block 828 to determine whether the videoconference session has ended. If unusual movement is detected, or the preset timer has elapsed, the method may proceed back to block 804 to repeat the process of centering and distance-normalizing a user's face within a captured videoframe during the remainder of the videoconference session. By repeating the loop between blocks 804 and 822, the intelligent face framing management system may continuously center and resize a user's face within a captured videoframe to ensure the user's facial expressions are viewable by other participants.

At block 828, the intelligent face framing management system in an embodiment may determine whether the videoconference session has ended. The method of centering and distance-normalizing a user's face within a captured videoframe in an embodiment may be repeated separately for each videoconference session in which the user may engage, because the user's position with respect to various cameras may shift in between videoconference sessions. As such, if the current videoconference session has concluded, the method of centering and distance-normalizing a user's face within a captured videoframe may then end. If the current videoconference session has not yet concluded, the method may proceed back to block 824 to capture new TOF data and determine whether the user has changed position with respect to the camera. By repeating the loop between blocks 824 and 828, the intelligent face framing management system in an embodiment may continuously monitor the position of the user with respect to the camera capturing images of the user during the videoconference session in order to constantly adjust the size and orientation of the image of the user's face within captured videoframes.

The blocks of the flow diagrams of FIGS. 7, and 8 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An information handling system executing an intelligent face framing management system comprising:
    a processor configured to execute code instructions of a multimedia multi-user collaboration application to join a videoconference session with a remotely located computing device;

a display screen, a speaker, and a microphone;

a video camera configured to capture a videoframe of a user's image;

the processor to input the videoframe data, including the user's image, and audiovisual (AV) processing instructions to be applied to videoframes into a trained neural network of the intelligent face framing management system;

the processor to execute code instructions of the trained neural network of the intelligent face framing management system to determine a face center and a face image;

the intelligent face framing management system to output an optimized normalizing face framing adjustments to adjust the size of the face image relative to the captured videoframe to within a size percentage range threshold of the face image in the captured videoframe;

the processor to execute an AV processing instruction module configured to execute a digital zoom process on the face image in the captured videoframe to meet the size percentage range threshold in the videoframe; and a network interface device configured to transmit a processed, encoded media sample, including the captured videoframe to a remotely located computing device participating in the videoconference session.

2. The information handling system of claim 1 further comprising:

the processor to detect user movement with a proximity sensor, during additional captured videoframes;

the processor to execute the intelligent face framing management system to output an adjusted optimized normalizing face framing adjustment in response to the detected user movement.

3. The information handling system of claim 1 further comprising:

the processor to detect user movement toward or away from the video camera in additional captured videoframes;

the processor to the additional captured videoframes, including the user's image, into the trained neural network of the intelligent face framing management system; and the processor to execute the AV processing instruction module configured to execute the digital zoom process on the face image in the additional captured videoframes to meet the size percentage range threshold in the videoframe according to a second optimized normalizing face framing adjustment.

4. The information handling system of claim 1 further comprising:

the processor to execute code instructions of the intelligent face framing management system to output an optimized centering face framing adjustment to center the face image location in the captured videoframe; and the processor to execute an AV processing instruction module configured to crop the videoframes to center the face image location in the captured videoframe according to the optimized normalizing face framing adjustment.

5. The information handling system of claim 4 further comprising:

the processor to detect user movement in additional captured videoframes;

the processor to execute the intelligent face framing management system to determine movement of the user to a first side of the captured videoframe that is off-center beyond a threshold amount of shift from center; and the processor to execute the AV processing instruction module configured to crop the captured videoframes to re-center the face image location in the additional captured videoframes according to a second optimized centering face framing adjustment.

6. The information handling system of claim 1 further comprising:

the processor to execute code instructions of an intelligent face framing management system user interface to receive a user image normalizing setting from a user to set a desired size of the user's image to determine the size percentage range threshold of the face image in the captured videoframe.

7. The information handling system of claim 1 further comprising:

a proximity sensor to detect persons or objects in front of the video camera;

the processor to execute code instructions of an unusual movement detection (UMD) software module to receive proximity sensor distance data and to determine movement of a user location in front of the video camera relative to a face image location within a series of captured videoframes.

8. The information handling system of claim 6, wherein the proximity sensor is a time-of-flight (TOF) sensor.

9. A method for intelligently face framing a user's image within captured videoframes in a collaboration videoconference session for an information handling system, comprising:

executing code instructions, via a processor, of a multimedia multi-user collaboration application, via a processor, to join a videoconference session of a remotely located computing device;

capturing a videoframe of a user's image via a video camera;

inputting videoframe data, including the user's image, and audiovisual (AV) processing instructions to be applied to videoframes into a trained neural network of the intelligent face framing management system to determine a face center;

executing code instructions of the intelligent face framing management system to output an optimized centering face framing adjustment to center a face image location in the captured videoframe;

executing an AV processing instruction module configured to crop the videoframes to center the face image location in the captured videoframe according to the optimized centering face framing adjustment; and transmitting, via a network interface device, a processed, encoded media sample, including the captured videoframe to a remotely located computing device participating in the videoconference session.

10. The method of claim 9 further comprising:

detecting user movement, via a proximity sensor, during additional captured videoframes;

the processor to detect user movement with a proximity sensor, during additional captured videoframes;

executing the intelligent face framing management system to output an adjusted optimized centering face framing adjustment in response to the detected user movement.

11. The method of claim 9 further comprising:

detecting user movement, via a proximity sensor, in additional captured videoframes;

executing the intelligent face framing management system to determine movement of the user to a first side of the captured videoframe that is off-center beyond a threshold amount of shift from center; and executing the AV processing instruction module configured to crop the captured videoframes to re-center the face center location in the captured videoframe according to a second optimized centering face framing adjustment.

12. The method of claim 9 further comprising:

executing code instructions of the trained neural network of the intelligent face framing management system to determine a face image in the user's image of the captured videoframe and to output optimized face framing adjustments to adjust the size of the face image relative to the captured videoframe to within a size percentage range threshold of the face image in the captured videoframe; and executing an AV processing instruction module configured to execute a digital zoom process on the face image in the captured videoframe to meet the size percentage range threshold pursuant to an optimized normalizing face framing adjustment.

13. The method of claim 12 further comprising:

detecting user movement, via a proximity sensor, in additional captured videoframes;

inputting the captured videoframe data, including the user's image, into the trained neural network of the intelligent face framing management system to determine an updated face image in the captured videoframe in response to user movement changes; and executing an AV processing instruction module configured to execute a digital zoom process on the updated face image in the captured videoframe to meet the size percentage range threshold.

14. The method of claim 9 further comprising:

executing code instructions of an intelligent face framing management system user interface to receive feature settings from a user to select face centering or face size normalizing to be activated during the videoconference session.

15. The method of claim 9 further comprising:

detecting, via a proximity sensor, persons or objects in front of the video camera;

inputting the proximity sensor distance data and a plurality of captured videoframes into the trained neural network of the intelligent face framing management system to determine the user location in front of the video camera and motion of the user location relative to the face image location within the captured videoframe.

16. An information handling system executing an intelligent face framing management system comprising:

a processor configured to execute code instructions of a multimedia multi-user collaboration application to join a videoconference session with a remotely located computing device;

a display screen, a speaker, and a microphone;

a plurality of video cameras configured to capture videoframes of a user;

the processor to execute code instructions of plural AV processing instruction modules to determine gaze and head orientation vectors of a user's image within the captured videoframes from each of the plurality of video cameras;

the processor to input the videoframe data from the plural cameras, including a series of plural videoframes from each of the plurality of video cameras, the gaze and head orientation vectors of a user's image within the captured videoframes, and audiovisual (AV) processing instructions to be applied to videoframes into the intelligent face framing management system;

the processor to execute code instructions of the intelligent face framing management system to select a gaze-centered video camera from the plurality of video cameras that has the minimum deviation from a central gaze of the user in the user's image in the captured videoframe;

the selected gaze-centered video camera to capture the videoframes of the user for the video conference; and a network interface device configured to transmit a processed, encoded media sample, including the captured videoframe from the gaze-centered video camera to a remotely located computing device participating in the videoconference session.

17. The information handling system of claim 16 further comprising:

the processor to input the user's image in the captured videoframe from the gaze-centered video camera into the trained neural network of the intelligent face framing management system to determine a face center and a face image; and the processor to execute code instructions of the intelligent face framing management system to output optimized face framing adjustments to center the face image location in the captured videoframe via an AV processing instruction module configured to crop the videoframes to center the face image location in the captured videoframe.

18. The information handling system of claim 16 further comprising:

the processor to input the user's image in the captured videoframe from the gaze-centered video camera into the trained neural network of the intelligent face framing management system to determine a face center and a face image; and the processor to execute code instructions of the intelligent face framing management system to output optimized face framing adjustments to adjust the size of the face image relative to the captured videoframe to a size percentage range threshold of the face image in the captured videoframe via an AV processing instruction module configured to execute a digital zoom function on the face image in the captured videoframe to meet the size percentage range threshold.

19. The information handling system of claim 16 further comprising:

the processor to detect user movement in additional captured videoframes; and the processor to execute code instructions of the trained neural network of the intelligent face framing management system to change selection of the gaze-centered video camera from the plural video cameras when the minimum deviation from a central gaze of the user in the user's image in the captured videoframe among the plural video cameras changes based on updated captured videoframes from the plurality of cameras, and updated gaze and head orientation vectors of the user's image within the captured videoframes.

20. The information handling system of claim 19 further comprising:

a proximity sensor to detect persons or objects in front of the plural video cameras; and the processor to execute code instructions of an unusual movement detection (UMD) software module to receive proximity sensor distance data and to determine movement of a user location in front of the video camera relative to a user's image location within a series of captured videoframes to determine a change in selection of the gaze-centered video camera from the plurality of video cameras.

\* \* \* \* \*